(12) United States Patent
Gathman et al.

(10) Patent No.: US 12,045,764 B2
(45) Date of Patent: Jul. 23, 2024

(54) AUTOMATED DISPATCH AND DELIVERY CONFIRMATION

(71) Applicant: SUPERIOR BULK, INC., Mayer, AZ (US)

(72) Inventors: Corey Gathman, Mesa, AZ (US); Bill Jondahl, Phoenix, AZ (US); Gary Curtis, Phoenix, AZ (US); Jeremy Jondahl, Mesa, AZ (US); Joel Jondahl, Mesa, AZ (US); Brad Belt, Glendale, AZ (US)

(73) Assignee: SUPERIOR BULK, INC., Mayer, AZ (US)

( * ) Notice: Subject to any disclaimer, the term of this patent is extended or adjusted under 35 U.S.C. 154(b) by 0 days.

(21) Appl. No.: 17/738,675

(22) Filed: May 6, 2022

(65) Prior Publication Data

US 2022/0261752 A1 Aug. 18, 2022

Related U.S. Application Data

(63) Continuation-in-part of application No. 16/375,789, filed on Apr. 4, 2019, now Pat. No. 11,358,785.
(Continued)

(51) Int. Cl.
*G06Q 10/0833* (2023.01)
(52) U.S. Cl.
CPC ................ *G06Q 10/0833* (2013.01)
(58) Field of Classification Search
CPC ............................................... G06Q 10/0833
See application file for complete search history.

(56) References Cited

U.S. PATENT DOCUMENTS

| 3,866,770 A | 2/1975 | Palmer |
| 4,247,228 A | 1/1981 | Gray et al. |

(Continued)

FOREIGN PATENT DOCUMENTS

| CN | 202670685 U | 1/2013 |
| EP | 0803714 A2 | 10/1997 |
| KR | 101374081 B1 | 3/2014 |

OTHER PUBLICATIONS

Hugo Van Driel, Radical Innovation as a Multilevel Process: Introducing Floating Grain Elevators in the Port of Rotterdam, 2005, p. 51-76 (Year: 2005).*
(Continued)

*Primary Examiner* — Ibrahim N El-Bathy
(74) *Attorney, Agent, or Firm* — Loza & Loza, LLP; Michael I. Angert

(57) ABSTRACT

A delivery management system and method is disclosed. A system receives storage chamber sensor data corresponding to material stored in a storage chamber, transport container data corresponding to material stored in a transport container, proximity sensor data corresponding to a proximity of the transport container to the storage chamber, and engagement sensor data corresponding to engagement between the storage chamber and the transport container. The system generates a confirmation of delivery of the material to the storage chamber based on the storage chamber sensor data, the transport container sensor data, the proximity sensor data, and the engagement sensor data and transmits an invoice for the delivery of the material based on the confirmation. Other systems and aspects are also described.

12 Claims, 12 Drawing Sheets

Related U.S. Application Data

(60) Provisional application No. 62/652,863, filed on Apr. 4, 2018.

(56) References Cited

U.S. PATENT DOCUMENTS

| | | | |
|---|---|---|---|
| 4,449,861 | A | 5/1984 | Saito et al. |
| 4,907,933 | A | 3/1990 | Kressly et al. |
| 5,341,856 | A | 8/1994 | Appenzeller |
| 5,346,352 | A | 9/1994 | Ito |
| 5,351,725 | A | 10/1994 | Suthergreen et al. |
| 5,482,425 | A | 1/1996 | Podd et al. |
| 6,064,311 | A | 5/2000 | Ferenczi et al. |
| 6,158,926 | A | 12/2000 | Precetti |
| 6,343,896 | B1 | 2/2002 | Goodier et al. |
| 6,366,829 | B1 | 4/2002 | Wallace |
| 6,447,215 | B1 | 9/2002 | Wellmar |
| 6,454,496 | B1 | 9/2002 | Mills et al. |
| 6,554,546 | B2 | 4/2003 | Dunlop et al. |
| 8,079,245 | B1 | 12/2011 | Owens et al. |
| 8,656,693 | B2 | 2/2014 | Madsen et al. |
| 9,961,877 | B1 | 5/2018 | Aulick |
| 10,150,400 | B2 | 12/2018 | Wood |
| 10,657,486 | B1 * | 5/2020 | Wolter ............... G06Q 10/0833 |
| 10,909,648 | B2 * | 2/2021 | Ibe ......................... B65G 61/00 |
| 2002/0107645 | A1 | 8/2002 | Uzzo et al. |
| 2003/0217596 | A1 | 11/2003 | Dirksen |
| 2006/0015543 | A1 | 1/2006 | Humphrey |
| 2006/0056924 | A1 | 3/2006 | Jurkovich |
| 2008/0283142 | A1 | 11/2008 | Steffl et al. |
| 2009/0288482 | A1 | 11/2009 | Faist |
| 2009/0290790 | A1 | 11/2009 | O'Neill et al. |
| 2011/0162838 | A1 | 7/2011 | Mackenzie et al. |
| 2012/0204978 | A1 | 8/2012 | Fortis |
| 2013/0211658 | A1 | 8/2013 | Bonefas |
| 2013/0261792 | A1 * | 10/2013 | Gupta .................. B65G 1/1378 700/232 |
| 2015/0239384 | A1 | 8/2015 | Meier |
| 2015/0264866 | A1 | 9/2015 | Foster et al. |
| 2015/0313080 | A1 | 11/2015 | Matousek et al. |
| 2016/0152421 | A1 | 6/2016 | Bawri |
| 2017/0190523 | A1 | 7/2017 | Oren et al. |
| 2017/0327326 | A1 | 11/2017 | Lucas et al. |
| 2018/0111538 | A1 | 4/2018 | Detter et al. |
| 2018/0165782 | A1 * | 6/2018 | Ibe .......................... G06Q 50/28 |
| 2018/0232693 | A1 * | 8/2018 | Gillen ............... G06Q 10/0834 |
| 2019/0061593 | A1 | 2/2019 | Harper et al. |
| 2019/0100391 | A1 | 4/2019 | Managan |
| 2019/0130349 | A1 * | 5/2019 | Ferguson ......... G06Q 10/08355 |
| 2019/0218045 | A1 | 7/2019 | Thomson et al. |
| 2019/0308825 | A1 | 10/2019 | Ge et al. |
| 2019/0322461 | A1 | 10/2019 | Banthia et al. |
| 2020/0125109 | A1 | 4/2020 | Velten et al. |
| 2020/0255235 | A1 | 8/2020 | Ruhland et al. |
| 2020/0324985 | A1 | 10/2020 | Posselius et al. |
| 2020/0394608 | A1 | 12/2020 | Trim et al. |

OTHER PUBLICATIONS

Silotrack Cloud Remote Inventory Management System—Monitor Technologies, LLC, http://www.feedandgrain.com/ProducUsilotrack-cloud-remote-inventory-management-system, retrieved Mar. 12, 2019, 3 pages.

Shapiro, Vladimir "Three Ways Companies are Improving Silo Management with IOT", https://westernacher-consulting_com/three-ways-companies-improving-silo-management-iot/, retrieved Mar. 14, 2019; 4 pages {Sep. 6, 2018).

Graves et al., "Inventory Management Method and Apparatus", U.S. Statutory Invention Registration No. H1743, published Aug. 4, 1998, 20 pages.

* cited by examiner

| Bulk Material Delivery Process | | | | | | |
|---|---|---|---|---|---|---|
| | Order 902 | Transport 904 | Arrival 906 | Unloading 908 | Invoicing 910 | Matching 912 |
| Supplier | Receive and fill order | | | | Automatic Invoice | |
| Hauler | | Monitor route | Detect arrival at consignee site; Detect arrival at point of delivery | Detect engagement; Monitor unloading operation; Detect unloading complete; Detect departure | Automatic Invoice | |
| Consignee | Monitor silo system, place order for material at a suitable time | | Detect delivery vehicle arrival at site; Detect arrival at point of delivery | Detect engagement; Monitor loading operation; Detect loading complete | Automatic Invoice | |

FIG. 9

AUTOMATED DISPATCH AND DELIVERY CONFIRMATION

CROSS-REFERENCE TO RELATED APPLICATION

This application is a Continuation-In-Part of copending U.S. nonprovisional patent application Ser. No. 16/375,789, filed Apr. 4, 2019 and titled "Silo System and Bulk Material Management System," which claims the benefit of and priority to U.S. provisional patent application Ser. No. 62/652,863, filed Apr. 4, 2018 and titled "Smart Portable Silo," the entire disclosures of which are incorporated herein by reference in their entirety and for all applicable purposes.

TECHNICAL FIELD

This disclosure generally relates to transport and storage services, and more particularly, to a bulk material delivery system that uses sensor data to improve the efficiency and reliability of a delivery.

INTRODUCTION

Distribution and delivery of bulk materials, such as powders, from suppliers to consignees is typically performed via pneumatic tank trucks. For example, bulk material delivery of the constituents of concrete, including but not limited to cement, fly ash, and lime, is almost continuously needed at construction sites, at ready-made concrete suppliers, concrete block manufacturers, cement bagging plants, etc., to maintain operations. These consignees generally maintain one or more operational silos for on-site storage of an inventory of bulk materials.

Needless to say, to operate a delivery service for such bulk materials, or in fact, for any goods, a hauler or shipper seeks to improve their operational efficiency. For example, a mechanism to speed up the unloading of bulk powder materials from a pneumatic tank truck into a consignee's silo could increase the number of deliveries they can make in a given amount of time. Many haulers, shippers, and delivery companies, as well as their customers (both suppliers and consignees) are naturally in need of ways to improve reliability and efficiency of such delivery services.

SUMMARY

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

In one example, a method for delivery management is disclosed. The method includes receiving storage chamber sensor data corresponding to material stored in a storage chamber, receiving transport container sensor data corresponding to material stored in a transport container, receiving proximity sensor data corresponding to a proximity of the transport container, and receiving engagement sensor data corresponding to engagement between the storage chamber and the transport container. The method further includes generating a confirmation of delivery of the material to the storage chamber based on the storage chamber sensor data, the transport container sensor data, the proximity sensor data, and the engagement sensor data and transmitting an invoice for the delivery of the material based on the confirmation.

In another example, a delivery management system is disclosed. The delivery management system includes a storage chamber sensor communicatively coupled to a processor and configured for sensing material stored in a storage chamber. The system further includes a transport container sensor communicatively coupled to the processor and configured for sensing material in a transport container. The system further includes a proximity sensor communicatively coupled to the processor and configured for sensing a proximity of the transport container to the storage chamber. The system further includes an engagement sensor communicatively coupled to the processor and configured for sensing an engagement between the storage chamber and the transport container. And the system further includes a communication interface communicatively coupled to the processor. The communication interface is configured for transmitting an invoice for a delivery based on a confirmation of the delivery of the material from the transport container to the storage chamber based on data from the storage chamber sensor, the transport container sensor, the proximity sensor, and the engagement sensor.

In another example, a silo system is disclosed. The silo system includes a storage chamber, an intake pathway associated with the storage chamber and configured to be pressurized by a pneumatic source, and a discharge pathway associated with the storage chamber and configured to be pressurized by a pneumatic source. The system further includes one or more material sensors associated with the storage chamber for generating sensor data relating to a presence of material stored in the storage chamber. The system further includes one or more actuators for enabling a deposit of additional material from a transport container into the storage chamber through a pressurized intake pathway at least partially simultaneous with a discharge of material from the storage chamber through a pressurized discharge pathway into an operational silo, whereby the intake pathway and the interior of the storage chamber are pneumatically isolated from the discharge pathway. The system further includes a controller communicatively coupled to the one or more material sensors and to the one or more actuators, for controlling the one or more actuators in response to sensor data from the one or more material sensors to thereby provide for deposit of material through the intake pathway at least partially simultaneous with discharge of material through the discharge pathway.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF THE DRAWINGS

Various aspects of systems and methods will now be presented in the detailed description by way of example, and not by way of limitation, with reference to the accompanying drawings, wherein:

FIG. 9 is a cross-functional flow chart illustrating a process of bulk material delivery according to certain aspects of this disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

In some aspects, this disclosure provides for efficient and reliable management of transport or delivery services. As one example, a bulk material (e.g., cement) hauler typically delivers bulk materials by truck (e.g., a delivery truck, a pneumatic truck, a transport vehicle, etc.) from a bulk material supplier to a consignee. The bulk material hauler may operate as an intermediary between the supplier or manufacturer of the bulk material and the consignee. That is, the supplier, the consignee, or both may be customers of the bulk material hauler. Similar relationships may exist for transport or delivery services for any type or category of goods. For transport service providers, a hauler often picks up a material for delivery and receives a bill of lading from the material supplier. The hauler then provides a consignee (the receiving party) with a ticket (e.g., including a copy of the bill of lading) for signature upon delivery of goods, keeping a copy for themselves. Because the material delivered is deposited in bulk powdered or granule form into the consignee's steel silo or similar vessel, this paper ticket is often the only evidence by which the consignee can confirm receipt of the material, including the quantity noted on the bill of lading, when a corresponding invoice for the material (and, in some cases, a separate invoice from the hauler for the transport service) is received. Thus, timely and accurate confirmation of each delivery into each specific consignee silo is important to accurate tracking of inventory and subsequent billing and payment for the transaction between material supplier, hauler and consignee. In the current process used typically throughout the industry, receipt of a ticket/bill of lading is not an assurance of receipt of the correct load of material into the correct consignee silo, and the identification of misdirected (or undelivered) loads is generally not identified until weeks after delivery when supplier and/or hauler invoices are reconciled with bills of lading received by the consignee. Various aspects of the present disclosure provide for automation of this ticketing system with reliable, sensor-driven delivery confirmation.

Figure 1A:
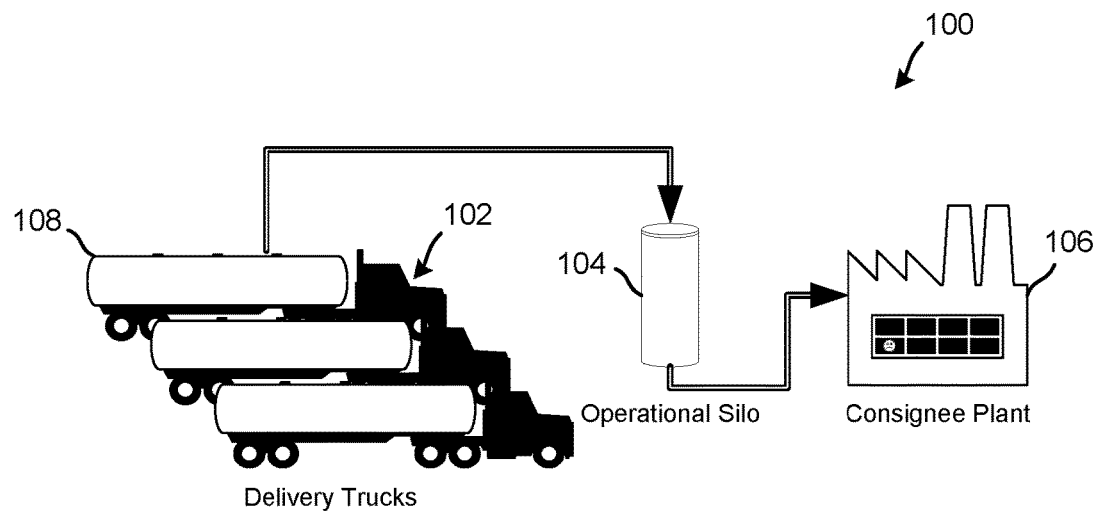
FIG. 1A is a schematic illustration of a conventional model for hauling bulk material to a consignee location or site.

With reference to FIG. 1A, a conventional model for hauling bulk material to a consignee site 100 involves the transport of bulk material by a bulk material hauler using one or more delivery trucks 102 carrying a transport container 108. A typical truck for the delivery of such bulk material has a pneumatic transport container 108 or tank that carries the bulk material, and a hose for connecting to an on-site storage facility. Once at the consignee site 100, the bulk material is transferred from the transport container 108 via a hose connected to an intake tube on an operational silo 104. Material may be stored at the operational silo 104 until needed by a consignee factory or plant 106 at that consignee site 100. (That is, when a delivery truck 102 arrives at a consignee site 100, a delivery truck operator connects a hose between the pneumatic transport container 108 and an intake tube on an on-site operational silo 104.) If the truck 102 is equipped with an air compressor or blower, the operator may hook the hose to a blower to create a pressure differential within the transport container. Alternatively, the consignee may have an external blower on-site. The operator then opens a valve on the pneumatic transport container 108 and the material discharges out of the container, through the hose and into the operational silo 104. Aeration lines aerate the material within the transport container to stir the material and aid its entrance into, and flow through, the discharge tube into the hose connected to the customer's operational silo. Once deposited into the operational silo, bulk material may be fed from there into a weigh bin for precise proportioning into the plant 106.

The conventional model for delivery or transport services has a number of areas amenable to improvement. For example, when a bulk material delivery truck arrives on site, all operational silos at a consignee site may already be at full capacity. When this occurs, the delivery truck may be delayed until adequate space is freed up in the operational silo 104 or, alternately, the material in the truck tank may have to be discharged into a temporary storage tank on site. In some examples, consignees, suppliers, and/or bulk material haulers may provide temporary storage at a consignee's site in the form of a "guppy" or "pig," which is a horizontal storage tank which, operating under pressure, can pneumatically discharge product into an operational silo in a manner similar to the pneumatic transport containers used in bulk hauling.

Furthermore, consignees that require a large amount of on-site fixed storage of bulk material encounter high costs both in terms of capital investment (e.g., operational silo costs) and continued operating costs. These consignees also face large physical space requirements that are associated with the provision of sufficient on-site fixed storage capacity.

Portable horizontal storage tanks, e.g., a guppy or pig as mentioned above, have certain disadvantages. For example, a pressure source and manual operation similar to the steps described above for unloading a pneumatic transport container 108 is needed to move material from a guppy to an on-site operational silo 104. Such a process generally requires an operator to manage the process, increasing labor costs and creating added safety issues. The process also prevents the discharge of new material into the guppy while material is being transferred out of it. Furthermore, portable horizontal storage tanks have large footprints relative to their storage capacity.

In addition, conventional bulk material delivery and transport models have inherent sources of slowing or delay. For example, long discharge times might be required to transfer a container full of bulk material to an operational silo 104 if the size of hoses and/or silo intake tubes is small. Also, additional wait times may be associated with the unloading or deposit of bulk material from a pneumatic transport container 108 into an operational silo 104 if, at the time of delivery, bulk material currently in that operational silo 104 is being unloaded or discharged into the consignee plant 106. That is, due to potentially competing pneumatic effects at the deposit and discharge ends of a silo 104, bulk material often cannot be deposited into a silo while material is being controllably discharged from the silo. For example, in a conventional silo system where material is discharged by gravity alone, the pneumatic effect provided by a blower at the deposit end may enter the silo, reach the discharge end, and interfere with the flow of discharging material. This can particularly occur in cases where the operational silo 104 is empty or the level of material in the silo 104 is too low to provide a barrier between the incoming pressurized air and the discharge port. Because pneumatic deposit of bulk material into an operational silo 104 can force too-fast discharge of bulk material from the operational silo 104 into the consignee site 106, the material-deposit operation is often performed separate from the material discharge operation, potentially causing a need for a material hauler to wait to unload their material into the silo.

Additional sources of delay in conventional bulk material delivery models arise from long transportation times from the supplier to the consignee due to unpredictable events such as traffic delays, road closures, or truck breakdowns. If the consignee doesn't order additional material before depleting its inventory, production may need to stop while waiting for a hauler to provide a material delivery and refill their silo. Even further, a consignee's operation can frequently deplete material in its operational silo much more quickly than the hauler can replace it. Thus, even if a delivery is being made, the consignee's inventory still may be unable to "catch up" during high demand periods.

A bulk material hauler may face further inefficiencies and delays. For example, the hauler may be unable to predict the demand for bulk material by an individual consignee due to short-notice cancellations of projects for the consignee, changes in weather that result in work stoppage by the consignee, equipment breakdowns, schedule changes, etc. Further, a consignee or group of consignees may have many locations far from one another, and the demand for bulk material from those different locations may be unpredictable and may vary. This scenario can result in difficult and time-consuming diversions or re-routing of deliveries.

The overall demand for transportation of bulk materials is seasonal in some geographic regions and subject to other very difficult-to-predict variables. Thus, demand may vary greatly over time, and may often be concentrated in short windows of "rush hours" at particular times of day and days of the week. Filling an operational silo 104 faster than a consignee consumes inventory may typically require multiple trucks 102 simultaneously delivering material to a single consignee site, which often is not possible due to congested space for truck parking, limited connection points, and/or limits on the air volume or pressure that may be imparted on the operational silo. Finally, the downstream product that the consignee produces with these bulk materials may be ready-mixed concrete, to be delivered to an active construction site with a very short window of workability. Because the ready-mixed concrete cannot be produced without these bulk materials, the possibility that a consignee may reduce or stop production of its products due to depletion of their bulk material inventory is very real, and the cost of such a shortfall in the middle of a concrete placement can be very high.

In conventional bulk material management systems, there may be no automated, real-time ordering or confirmation or verification of a delivery of bulk material to a silo 104. Instead, a delivery to a consignee site may be manually confirmed by an operator of the material hauler, e.g., truck driver, upon arrival at a site. For example, an operator may obtain a written signature on a paper bill of lading, scan a material receipt, or send an electronic communication to the consignee, supplier, and/or material hauler. While these conventional systems may confirm to the supplier that the bulk material arrived at the consignee site, they may fail to confirm that the material was actually deposited into a silo, let alone into the proper silo.

When a consignee receives an invoice from a supplier or from a material hauler, the consignee may in some cases be unable to locate a corresponding bill of lading or other records confirming the delivery. It may be that the consignee did not receive a ticket upon delivery, that the ticket was lost or misplaced, or for any reason the consignee's records may not be in accordance with the invoice. In such cases it may be difficult to identify the source of such discrepancy, as any number of different events may be the cause. While a mistake on the part of the supplier or material hauler, or theft of the goods during delivery can be a cause, a shipper may have simply delivered the goods to the wrong site. This can occur if the consignee has multiple delivery receiving sites. In another example, the information on the ticket and/or the invoice may simply be incorrect. For example, the supplier or hauler may make a mistake in generation of their respective invoices, or the delivered goods may have been different from the goods the consignee expected to receive—causing difficulty in the matching process, but furthermore, a potential disaster scenario when undiscovered at the time of delivery.

Consider a case where a consignee is a ready-mix concrete producer, preparing concrete on-demand for one or more construction projects. This operation may require frequent deliveries of bulk materials such as cement or fly ash to replenish their inventory. Not only may the consignee site have multiple storage tanks or silos in which a material hauler can deposit a bulk material delivery, but a particular consignee may have multiple different sites or locations (e.g., on-location at construction sites) where frequent deliveries are needed. In a case where the hauler mistakenly deposits a truckload of fly ash into a cement silo, for example, the consignee may face a records mismatch, causing recordkeeping difficulties when they receive an invoice for a fly ash delivery while internal records reflect a cement delivery, a delivery of fly ash to a different location, or potentially no record of delivery at all. More importantly, with such a delivery error, the consignee can suffer great cost and other damage to their operations. Because the recipe of blending raw materials is critical to the setting time, strength and other performance of ready mix concrete, such an error may lead to an improper batch, or batches, of concrete delivered to a foundation, column or wall remaining undiscovered for a substantial length of time, potentially multiplying the consignee's damages.

In various aspects, the present disclosure provides apparatus and systems that enable a reliable, efficient and real-time delivery confirmation for all parties involved. For example, a delivery vehicle and a consignee site or delivery location (e.g., a silo) may include suitable sensors for sensing information relating to the delivered materials or goods, the time of delivery, and the location of the delivery. The delivery vehicle and delivery location further include suitable communication systems for exchanging information relating to the delivery. The communication systems may further communicate with a dispatch system or network to coordinate ordering and delivery activity based on sensor and other data. As described further below, certain aspects disclosed herein may provide efficient delivery management in a dynamic workflow, reducing costs relating to on-site storage capacity and inventory. That is, if a consignee's inventory can be automatically and timely replenished as it is depleted then the consignee may be able to avoid work stoppages without needing to store vast amounts of inventory at any given time. Further aspects may provide highly coordinated deliveries by a material or goods hauler, making for efficient hauling services. For example, information provided by the disclosed system may enable a hauler to avoid delays relating to a lack of available storage space when a delivery arrives, or other issues that may slow or delay unloading of delivered goods or materials. Still further aspects may facilitate reliable and efficient delivery confirmation not only of the fact of a delivery, but further, that the correct amount of the correct goods or materials were delivered to the correct location at a given time. Such automated delivery confirmation can enable efficient invoicing and billing processes for all involved parties.

Figure 1B:
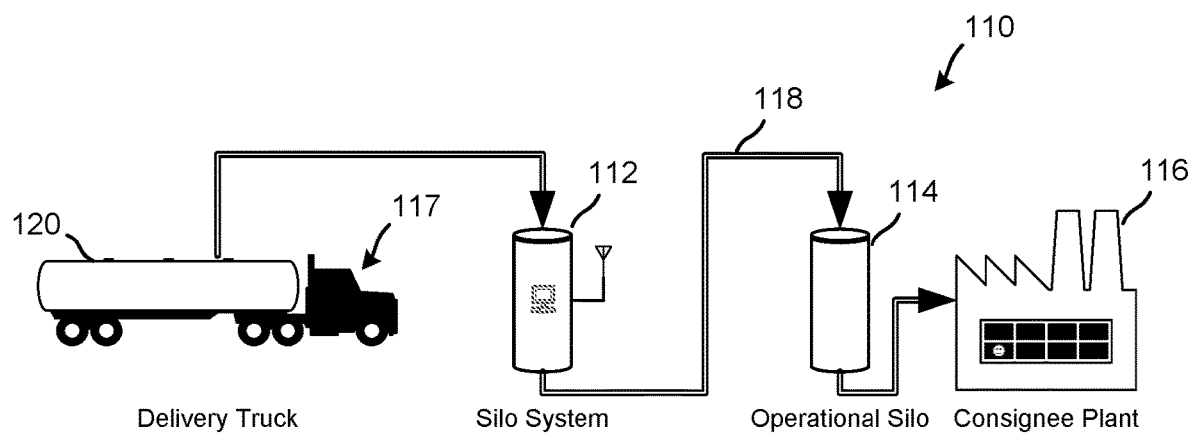
FIG. 1B is a schematic illustration of a storage-first model for hauling bulk material to a consignee location or site according to certain aspects of this disclosure.

With reference to FIG. 1B, in accordance with some aspects of this disclosure, a "storage-first" model for hauling bulk material to a consignee site 110 may involve the use of one or more silo systems 112 in conjunction with one or more operational silos 114. In some examples, a silo system 112 may be owned by the material hauler, rather than the consignee. For example, a material hauler may provide a portable silo system 112 configured for rapid loading and unloading. Such a portable silo system 112 may be erected in a manner that allows for subsequent relocation.

In operation, a silo system 112 may be semi-permanent, e.g., remaining at the same consignee site 110 for an extended period of time. However, if the consignee's order changes or terminates, if the hauler needs the storage capacity at a different consignee site, or for any other reason, the hauler may disconnect the silo system 112 from the operational silo 114 and relocate it as needed.

The silo system 112 can act as an inventory buffer and can provide the consignee site 110 with additional storage capacity. Thus, a consignee can increase their inventory turnover by adding storage at their site. For example, if storage were doubled, inventory turnover might potentially double. Conversely, at the same demand volume, doubling the consignee's storage would double the consignee's effective days of available inventory and double the time in between required material deliveries.

Similar to the conventional model, the storage-first model involves the transport of bulk material by a bulk material hauler using a delivery truck 117 carrying a transport container 120 in the form of a tank. Once at the consignee site 110, the hauler transfers the bulk material from the transport container 120 to a silo system 112. The silo system 112 stores the material until an operational silo 114 associated with the silo system 112 requires additional material.

While some aspects of this disclosure describe a silo system 112 operating separately from an operational silo 114, this need not necessarily be the case. That is, in some examples within the scope of this disclosure, an operational silo 114 may be outfitted with suitable sensors and communication system. Those of ordinary skill in the art will recognize that the use of a separate silo system 112 is optional, and disclosed examples may easily be modified to operate utilizing a suitably configured operational silo 114.

Figure 2:
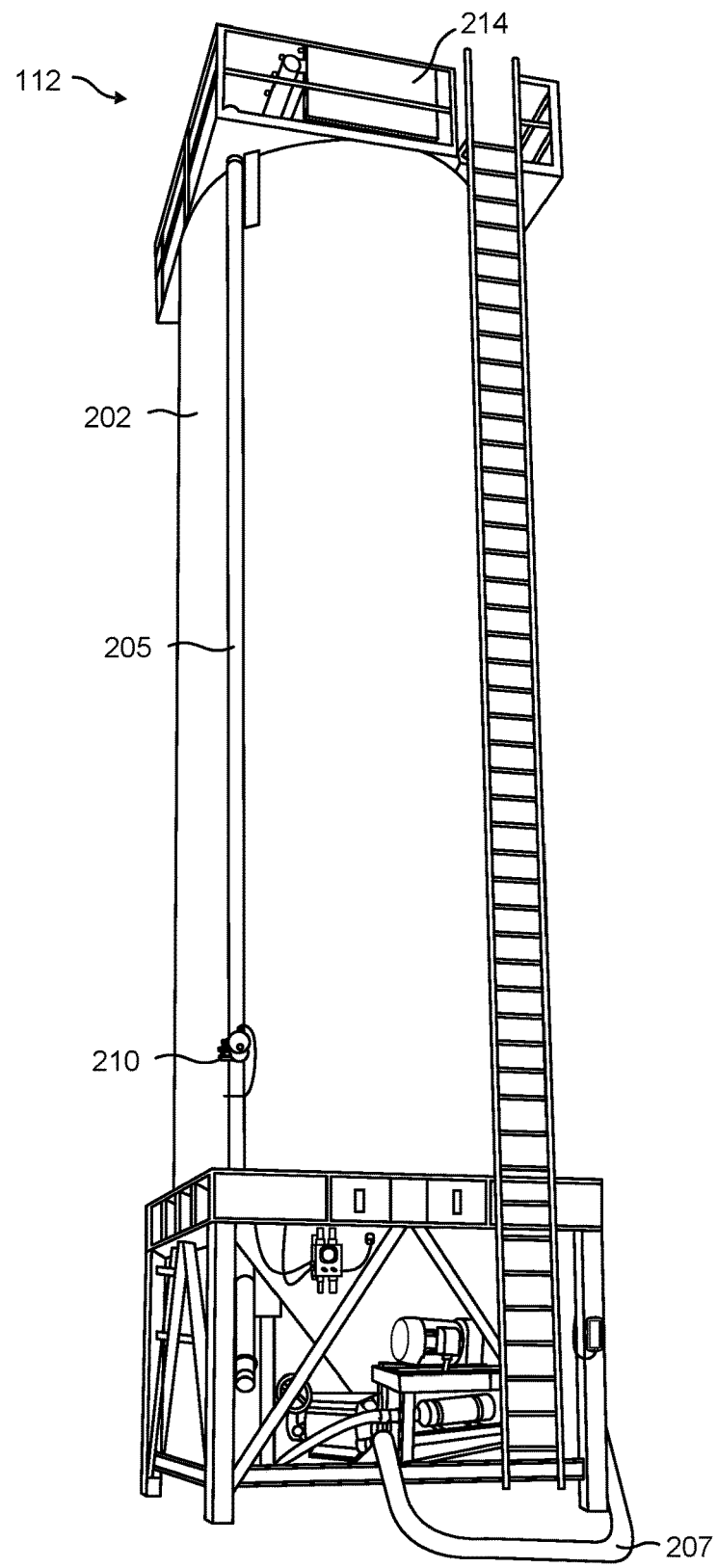
FIG. 2 is an illustration of one example of a silo system according to an aspect of the present disclosure.
Figure 3:
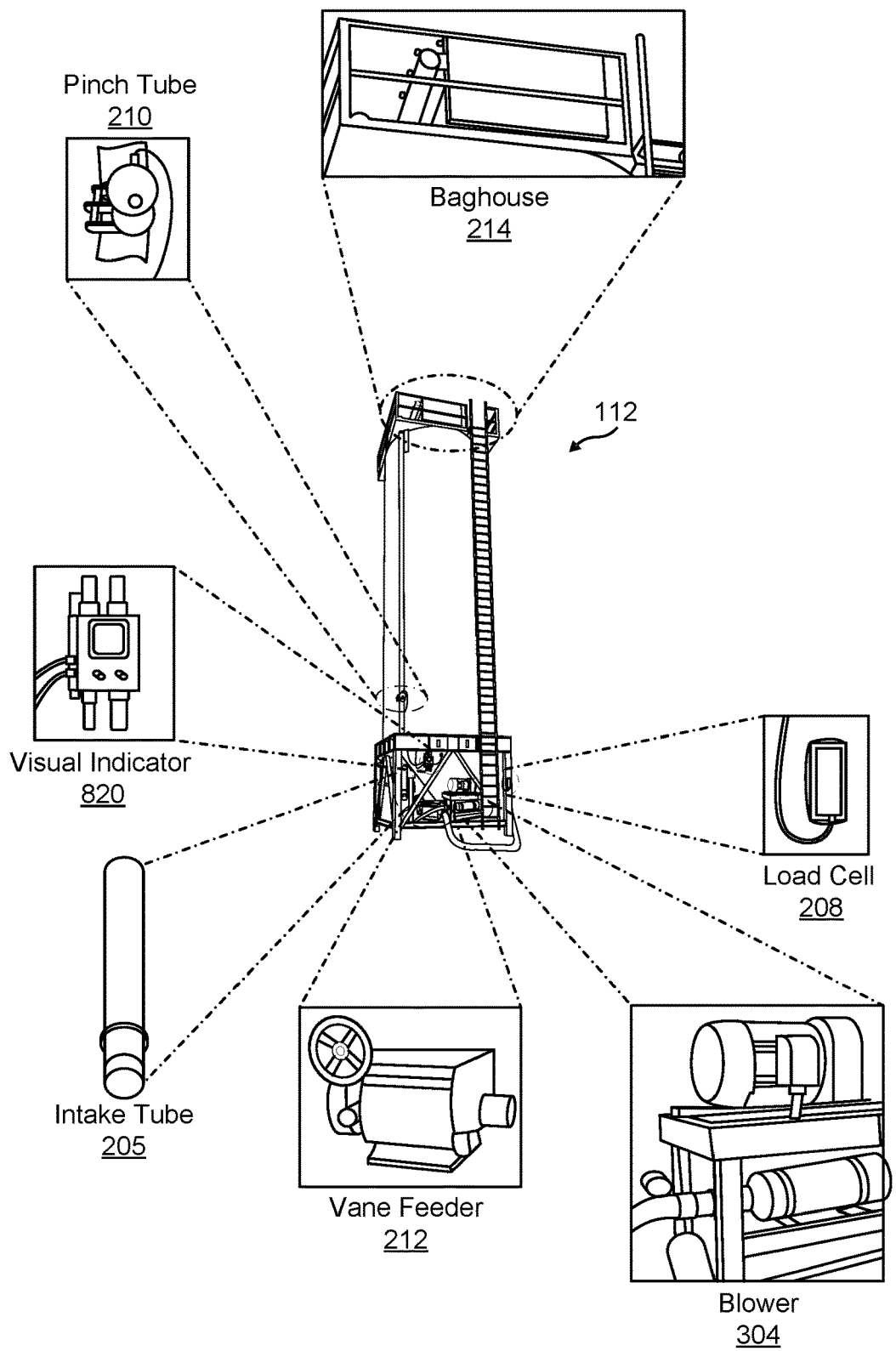
FIG. 3 is an exploded view showing details of certain components of the exemplary silo system of FIG. 2 according to some aspects of the present disclosure.

FIG. 2 is an illustration of one example of a fully-assembled silo system 112 according to an aspect of the present disclosure. FIG. 3 is an exploded view showing details of certain components of the exemplary silo system 112 of FIG. 2 according to some aspects of the present disclosure. The silo system 112 includes a bulk material storage unit in the form of a large-capacity silo, e.g., 120-160 tons.

Beginning at the deposit end of the silo system 112 and progressing toward the discharge end, the silo system includes a connector end of an intake tube 205 that forms part of an intake pathway 604 described below with reference to FIG. 6. The connector end of the intake tube 205 is configured to couple to a correspondingly sized output tube of a transport container carrying bulk material. The intake tube 205 is routed to the top of the storage chamber 202, where an output end is coupled to the interior of the storage chamber. The output tube of the transport container is a reinforced flexible rubber hose and is configured to withstand an internal pressure of up to 75 psi. The intake tube 205 is typically in the form of a schedule 40 steel pipe and is configured to withstand an internal pressure of up to 4600 psi.

In conventional bulk material delivery models, such as shown in FIG. 1A, transport of material from a transport container 108 to an operational silo 104 is conducted through hoses and pipes having a diameter of 4 inches. In an embodiment of the present silo system 112, however, the intake tube 205 is at least 5 inches in diameter. The larger diameter intake pathway of the present silo system 112 provides higher material handling capabilities, which in turn, enables a faster transfer of bulk material into the storage chamber 202.

The vehicle carrying the transport container may provide pneumatic pressure to transfer the material from the transport container, through the intake tube 205, to the top of and into the storage chamber 202. In operation, the truck blows bulk material into the intake pathway through the intake tube 205, which moves the material toward the top of the storage chamber 202, where the material enters the chamber. The material is moved through the intake tube 205 via pneumatic pressure.

As described below with reference to FIG. 6, the intake pathway 604 includes one or more intake actuators such as a pinch tube 210. The pinch tube 210 contains an electrical pinch valve that functions to cut off or block further ingress of bulk material from the transport container into the intake tube 205 under certain conditions. For example, the pinch tube may activate in cases of overpressure within the intake pathway 604, or if the storage chamber 202 has reached its capacity and cannot intake additional material. Utilizing an electric pinch tube 210 rather than a pneumatic pinch tube eliminates the need for the consignee to provide a source of pneumatic pressure. In this way, the silo system 112 may remain operational at all hours, even when the consignee site is closed, unsupervised, and/or unoccupied. This can open up the schedule for delivery of material to the portable silo, further improving flexibility for the hauler.

Figure 4:
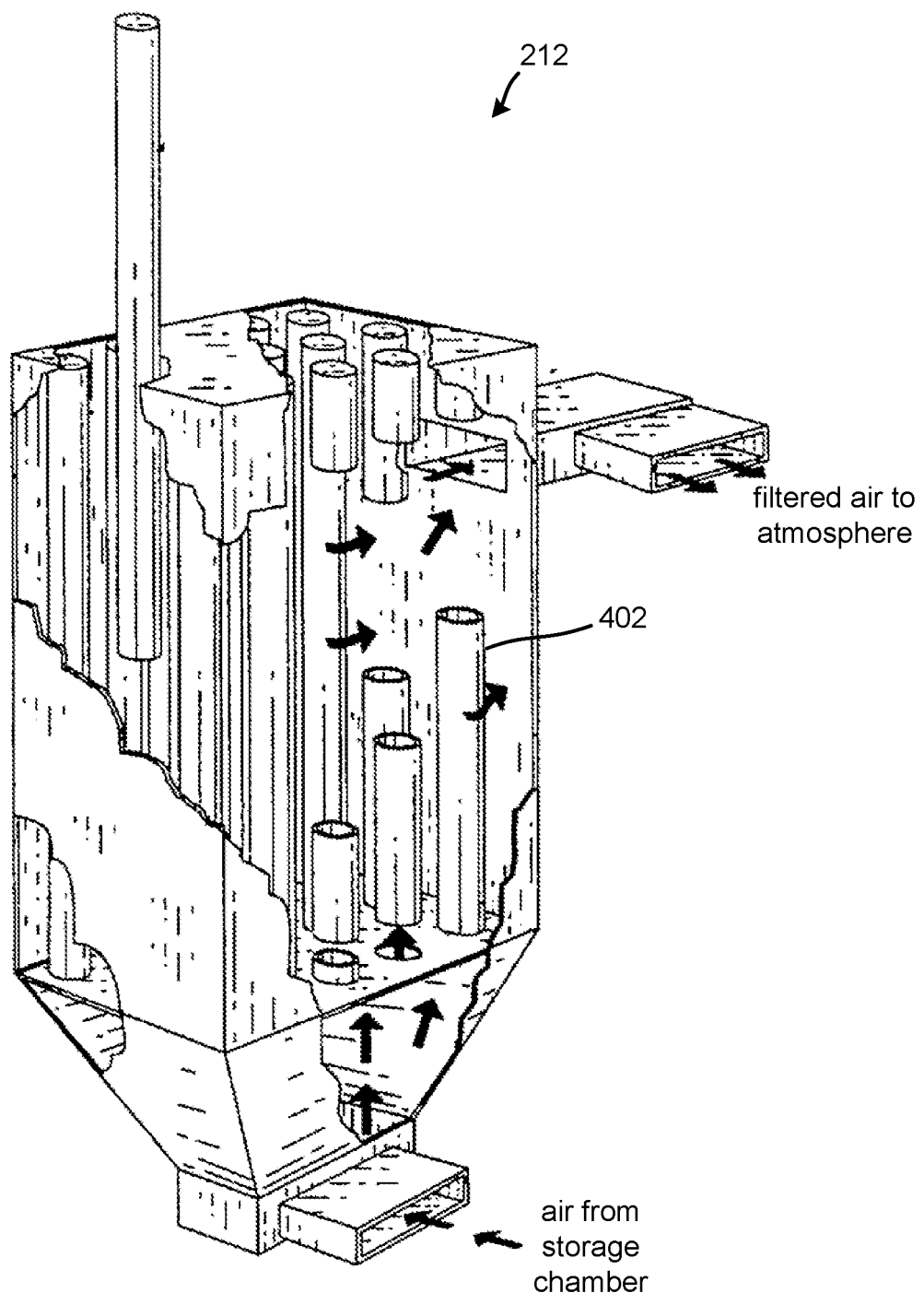
FIG. 4 is a schematic illustration of one example of a baghouse that may be included in the silo system of FIG. 2.

Continuing with FIGS. 2 and 3, the silo system 112 may include an air filter mechanism. In one configuration, the air filter mechanism may be in the form of a baghouse 214 positioned at the top of the storage chamber 202. FIG. 4 is an illustration of one example of a baghouse 214 that may be included in the silo system 112 of FIG. 2.

In operation, as bulk material enters the storage chamber 202, the material displaces air inside the chamber. In addition, the airflow that moves the material through the intake pathway 604 enters the storage chamber 202. Thus, without release, overpressure could rupture the storage chamber 202 or create enough backpressure to prevent further delivery of material into the chamber. Thus, the storage chamber 202 must be vented to allow excess air to exit into the atmosphere without allowing product dust to escape with it. Air quality regulations therefore require the released air to be filtered to remove a sufficient amount of dust.

Accordingly, the silo system 112 includes a baghouse 214 to filter the dust or particulate matter from the air as it is released from the storage chamber 202. With reference to FIG. 4, the baghouse 214 includes one or more cylindrical structures 402, e.g., bags or tubes, made of a fabric filter medium. Conventional silos may include six cylinders. However, in an aspect of the present disclosure, the baghouse 214 included in the silo system 112 may be substantially larger than a baghouse in a conventional silo. A larger baghouse 214 enables increased airflow, or an increased filter rate. In this way, the venting capacity of the storage chamber 202 matches the increased input from the large-diameter, high-volume intake tube 205; thus increasing the rate that material can be deposited into the storage chamber 202 relative to the rate typical in a conventional operational silo.

In one example, the baghouse 214 in the silo system 112 disclosed herein may double the size of the conventional silo's baghouse, e.g., including twelve or more cylinder structures 402. In a further example, such a baghouse may include twelve individual filter cartridges, which provide 472 square feet of filter area and 2400 cubic feet per minute (CFM) airflow. This compares to a typical baghouse for similar applications that includes six filter cartridges, with half the square footage and CFM airflow.

Figure 5A:
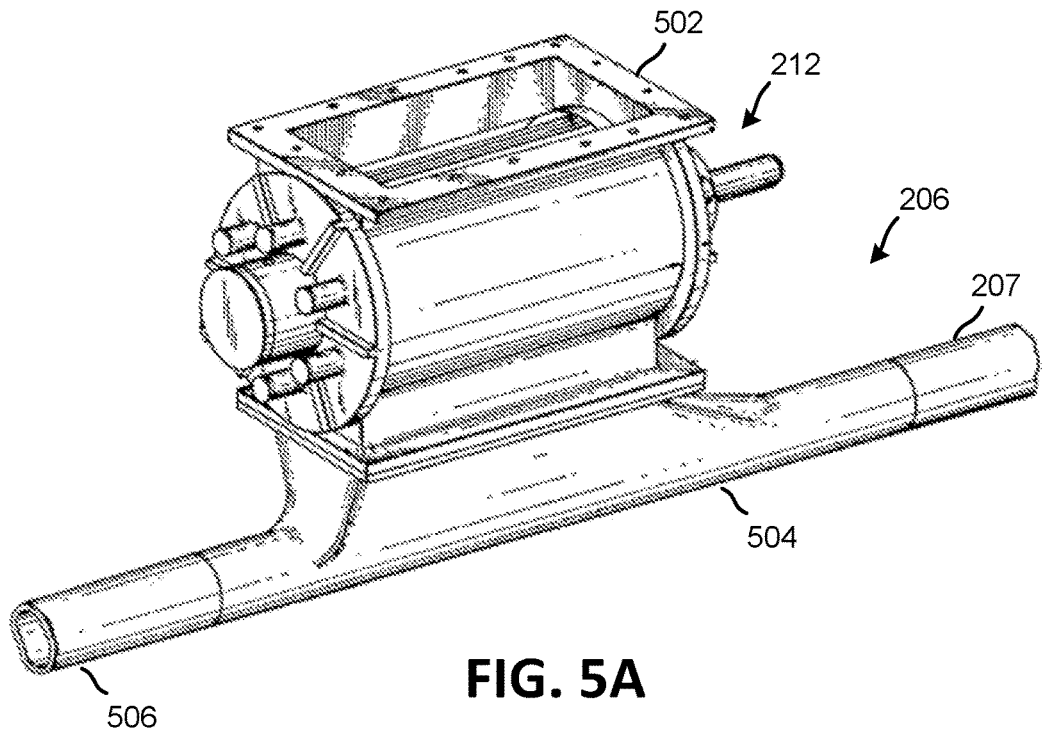
FIGS. 5A and 5B are schematic illustrations of one example of a vane feeder that may be included in the silo system of FIG. 2.
Figure 5B:
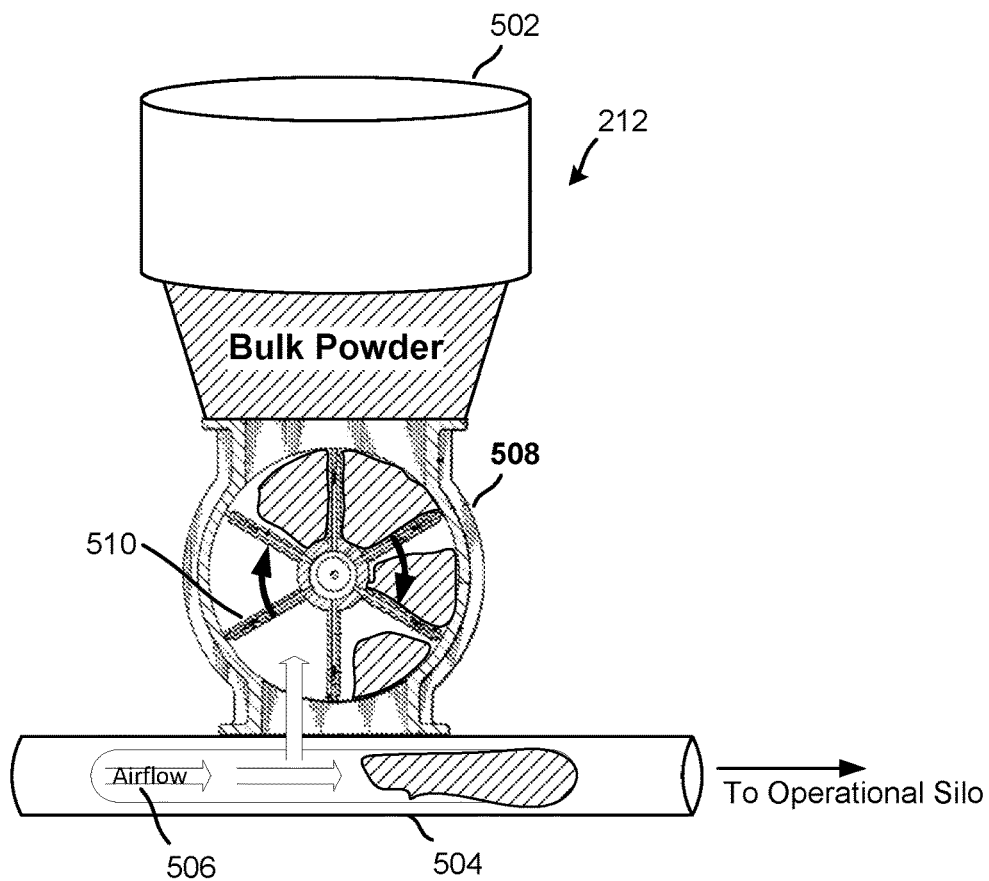

Returning to FIGS. 2 and 3, material may be discharged from the storage chamber 202 using an unpressurized gravity unloading, which is generally safer than pressurized unloading. To this end, the discharge end of the silo system 112 includes a vane feeder 212, also referred to as a rotary feeder, or rotary airlock feeder. FIGS. 5A and 5B are illustrations of one example of a vane feeder 212 that may be included in a silo system 112. The vane feeder 212 includes a material inlet 502 that interfaces with an outlet of the storage chamber 202 to receive bulk material, and an output pipe 504 that interfaces with the discharge pathway 206 at one end and a source of airflow 506 at the opposite end. The source of airflow 506 may be a blower 304, as shown in FIG. 3, configured to pressurize the output pipe 504 and the discharge pathway 206 tube/hose from the vane feeder 212 to transfer material to the operational silo. In one embodiment, the output pipe 504 and the discharge tube 207 defining the discharge pathway 606 are high volume capacity to allow for faster discharge of material from the storage chamber 202. For example, the output pipe 504 and the discharge tube 207 may have a diameter of at least 5 inches. The output pipe is typically in the form of a schedule 40 steel pipe and is configured to withstand an internal pressure of up to 4600 psi. The discharge tube 207 is a reinforced flexible rubber hose and is configured to withstand an internal pressure of up to 75 psi.

In operation, bulk material in the storage chamber 202 is gravity fed or force fed through the material inlet 502 and into the housing 508 of the vane feeder 212. A multi-vane rotor 510 within the housing 508 is driven about a rotor shaft by a motor. An airflow 506 stream flows through the output pipe 504 in the direction toward the operational silo, while the rotor 510 is driven in the direction indicated by the arrows. As bulk material is fed into the housing 508, the rotor 510 vanes move the material into the airstream passing through the output pipe 504. The rotor 510 vanes isolate the storage chamber 202 above from the discharge point below, allowing for pressurized filling of the storage chamber while simultaneously discharging material from the storage chamber. Thus, the vane feeder 212 functions to isolate the potentially pressurized storage chamber 202 that is being loaded with bulk material, from the discharge tube 207 that is moving material from the storage chamber 202 to the operational silo. In one configuration, the vane feeder 212 may be oversized for rapid discharging of the material from the storage chamber 202. For example, a vane feeder 212 may be sized to support unloading material from the storage chamber into the operational silo at a rate of one ton per minute.

Figure 6:
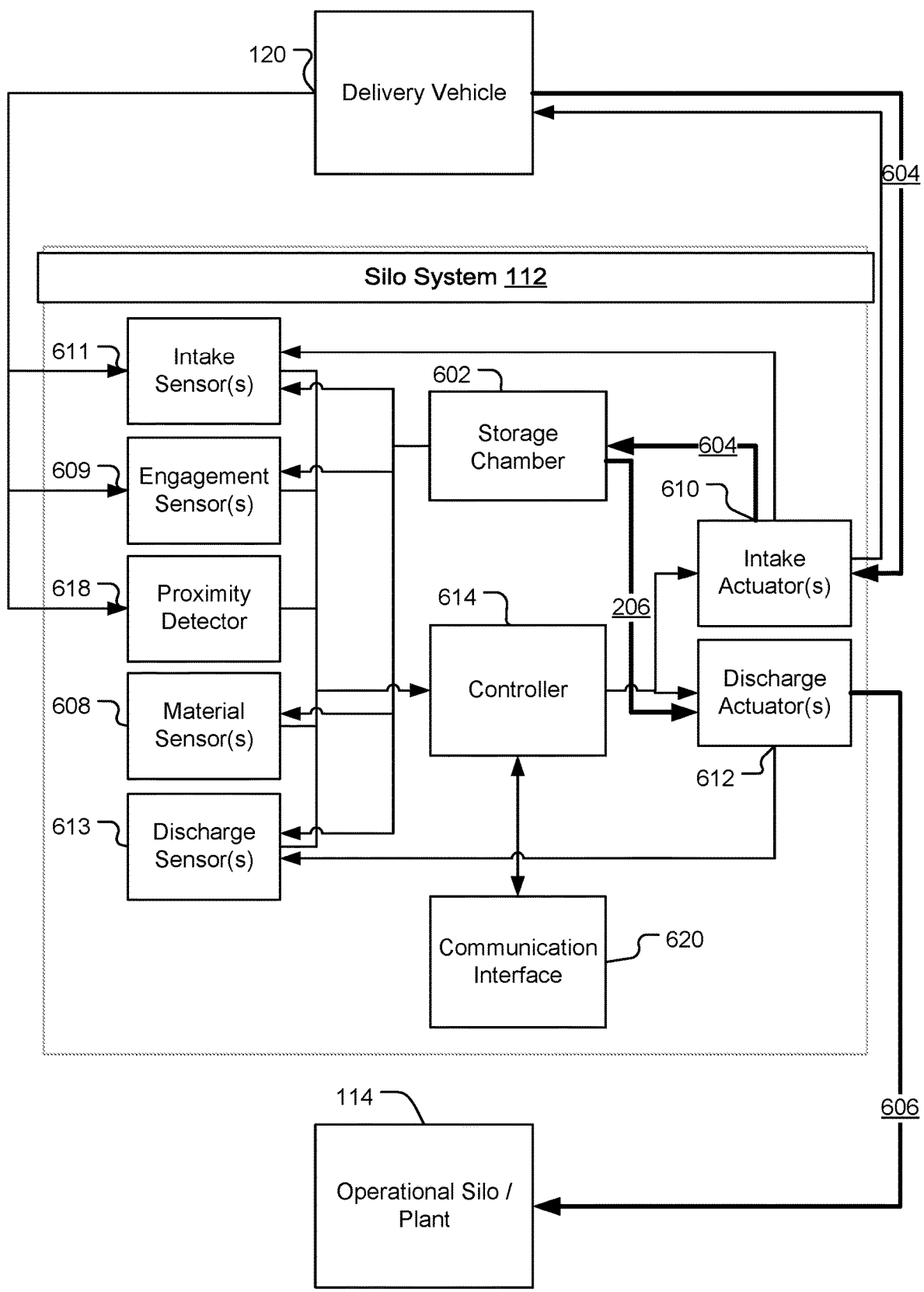
FIG. 6 is a schematic block diagram of a silo system according to certain aspects of this disclosure.

FIG. 6 is a schematic block diagram of a silo system 112 according to certain aspects of this disclosure. The silo system 112 includes a storage chamber 602, an intake pathway 604 associated with the storage chamber 602, which may be configured to be pressurized by a first pneumatic source, and a discharge pathway 606 associated with the storage chamber 602, which may be configured to be pressurized by a second pneumatic source. The first pneumatic source for the intake pathway 604 may be a blower configured to force air into a tubular structure. Likewise, the second pneumatic source for the discharge pathway 606 may be a blower configured to force air into a tubular structure. The silo system 112 further includes one or more material sensors 608 associated with the storage chamber 602, one or more intake actuators 610, one or more intake sensors 610, one or more discharge actuators 612, one or more discharge sensors 613, a proximity detector 618, and a controller 614 that is communicatively coupled to the one or more sensors 608, 609, 611, 613, and 618 and to the one or more actuators 610, 612. The controller 614 is configured to control the one or more actuators in response to sensor data from the one or more sensors. The controller 614 may be any suitable electronic controller including but not limited to a microprocessor, a microcontroller, a programmable logic controller (PLC), etc. In some embodiments, one or more of the sensors 608, 609, 611, 613, 618 controller 614, and/or communication interface 620 may be augmented to a pre-existing silo at a consignee site. In other embodiments, a consignee may employ a specialized silo (e.g., supplied by the material hauler) having integrated sensors and communication/control systems.

The actuators 610, 612 enable a deposit of additional material from a transport container 120 into the storage chamber 602 through a pressurized intake pathway 604 that may be at least partially simultaneous with a discharge of material from the storage chamber 602 through a pressurized discharge pathway 606 into an operational silo 114. The pressurized intake pathway 604 and the interior of the storage chamber 602 may be pneumatically isolated from the pressurized discharge pathway 606. The controller 614 is configured to control the one or more actuators 610, 612 in response to sensor data from the one or more material sensors 608 to thereby provide for deposit of material at least partially simultaneous with discharge of material. At least partially simultaneous in this context does not require that material deposit and material discharge always occur together. Rather, it means that the for a portion of time during which deposit is occurring, discharge is also occurring or vice-versa.

The intake pathway 604 is configured to be coupled to a corresponding pathway of a transport container 120 holding bulk material. The intake actuators 610 are configured to enable a deposit of material from the delivery vehicle 120 into the silo system 112 through the intake pathway 604. In one configuration, the intake pathway 604 includes a large diameter intake tube and an intake actuator 610 in the form of a pinch tube or pinch valve that is in line with the intake tube. In some versions, to facilitate rapid material intake, the intake tube may have a diameter of at least 5 inches. The intake actuator 610 may include a pinch tube or pinch valve configured to pinch off the intake tube as a means of controlling, e.g., turning off and on, the deposit of the material into the storage chamber 602. To this end, a pinch can create a physical obstruction in the tube that blocks the movement of material through the tube. The intake actuator 610 may further include a blower located at the silo system 112 and/or at the delivery vehicle 120. In some examples, a power take off (PTO) actuator may function to pressurize the intake pathway 604 for loading or intake into the storage chamber 602.

The discharge pathway 606 is configured to be coupled to a corresponding pathway of an operational silo 114. In one configuration the discharge pathway 606 includes a large diameter discharge tube and a discharge actuator 612 in the form of a vane feeder. An example vane feeder that may be used in the silo system 112 is described above with reference to FIGS. 5A and 5B. The discharge actuator(s) 612 (e.g., a vane feeder) may be configured to control a gravity-fed discharge of the material from the storage chamber 602 into the discharge tube while pneumatically isolating the intake tube from the discharge tube. As such, the discharge actuator 612 enables pressurized deposit or loading of material into the storage chamber 602 simultaneous with the discharge or unloading of material from the storage chamber 602 to the operational silo 114. Accordingly, simultaneous deposit into and discharge from a silo system 112 is enabled and thus, there is no need to wait for the completion of an ongoing discharge of bulk material from the storage chamber 602 before beginning a deposit of bulk material from a pneumatic transport container 120 into the storage chamber 602.

In some examples, to facilitate rapid discharge of material from the storage chamber 602, the discharge actuator 612 may be coupled to a large diameter discharge tube and configured for unloading material from the storage chamber 602 at a high rate. For example, in one embodiment, the discharge actuator 612 may be configured to support unloading material from the storage chamber 602 at a rate of at least one ton per minute.

In a further aspect of this disclosure, the discharge actuator(s) 612 may include a blower coupled to the discharge tube. The blower is configured to apply pneumatic pressure in the discharge tube to transfer the material from the storage chamber 602 to the operational silo 114.

The material sensor(s) 608 are configured to sense material stored in the storage chamber 602. Material sensors 608 may be configured to generate real-time material data relating to a presence of material in the storage chamber 602. Sensor data from the material sensor(s) 608 is provided to the controller 614 where it is processed to control the deposit and discharge of material through the silo system 112. The material sensor(s) 608 may include one or more weight sensors or load cells configured to generate weight information relating to a weight of material in the storage chamber 602. This weight information can be used to confirm the amount of material delivered, although the weight change over the course of a loading operation may differ from the amount delivered in the event of simultaneous unloading of the silo. Nevertheless, detecting an increase in the weight can provide the time and duration of a delivery and loading operation. If the duration of a delivery is known, then the duration of a weight change can potentially be used to confirm the delivery even if the weight change itself is off due to a simultaneous unloading operation. The material sensors 608 may further include a fill level sensor configured to generate fill level information relating to a level of the material in the storage chamber 602. The fill level may correspond to a simple indication whether or not greater than a threshold level of material is in the storage chamber 602, or in other examples, may provide real-time fill level data at any granularity up to a continuous indication of fill level. The material sensors 608 may further include a pressure sensor for generating pressure information relating to air pressure in the storage chamber 602.

The silo system 112 may further include one or more intake sensors 611 for determining if a material intake or loading into the storage chamber 602 is in process. For example, a pressure sensor may be associated with a fill pipe between the transport container 120 and the storage chamber 602 and configured to detect when the intake pathway 604 is pressurized. Intake sensors 611 may further include a blower engagement sensor associated with a blower coupled to the intake pathway 604. For example, a blower engagement sensor may determine when a blower associated with the intake pathway 604 is engaged, operational, or turned on. Intake sensors 611 may further include a pinch valve engagement sensor configured to detect a state (e.g., open or closed) of a pinch valve or pinch tube associated with the intake pathway 604. By virtue of the pinch tube the silo system 112 can be prevented from overflowing when being loaded with material. In a further example, if the silo system 112 identifies that an incorrect delivery is being made or is about to be made (e.g., an operator has connected a delivery vehicle to the wrong silo or the wrong intake tube), the pinch tube can be used to stop or prevent the incorrect delivery or unloading into the silo.

The silo system 112 may further include one or more engagement sensors 609 for determining whether a transport container is engaged with the intake pathway 604 for filling the storage chamber 602. For example, the engagement sensor(s) 609 may include a contact sensor configured to detect engagement and/or disengagement of a fill pipe between a delivery vehicle and the silo system 112. The contact sensor can employ any suitable mechanism for contact sensing, including but not limited to a magnetic sensor, an RFID tag, an electrical contact sensor, a capacitive sensor, a Hall effect sensor, a mechanical switch, etc. In a further example, the engagement sensor(s) may include a power take-off (PTO) engagement sensor configured for generating real-time PTO information indicative of an operational condition of the intake pathway. An operational condition may be indicated by the output of a PTO engagement sensor that is configured to determine the on-state and off-state of a blower generating a pneumatic effect within the intake pathway. The PTO engagement sensor is configured to detect PTO engagement and subsequent disengagement and output corresponding PTO information to the controller 614. The controller 614 may determine that the material is being deposited in response to PTO information corresponding to an engagement/on signal from the PTO engagement sensor. Subsequently, when the on state is no longer indicated by the output of the PTO engagement sensor, the controller 614 may determine that the deposit of material is completed. Based on the duration of material delivery, i.e., the time between the engagement/on signal and the disengagement/off signal, the controller 614 may determine or confirm the amount of material that was deposited. Accordingly, the PTO information output by the PTO engagement sensor provides an additional data point to corroborate actual, physical delivery of bulk material to the silo system 112.

The silo system 112 may further include one or more proximity detectors 618 for detecting if and when a transport container is located in the proximity of the silo system 112. In some examples, a proximity detector 618 may be directly coupled to the silo system 112 and configured to detect a close proximity of a transport container 120 to the silo system 112. In other examples, a proximity detector may be located at a point of entry (e.g., an entry gate or guard house) of the consignee site, or the site where the silo system 112 is located. That is, a proximity detector 618 may be configured for detecting a proximity of a transport container 120 at a point of entry of a consignee site and/or at a point of unloading of a material delivery. Proximity detectors 618 may include any suitable sensor for detecting a proximity of a transport container 120 and may be manual or automated. For example, a proximity detector 618 may be an RFID reader configured to detect a passing or proximity of a transport container 120 that includes a corresponding RFID tag. In another example, a proximity detector 618 may be a bar code scanner configured to detect a manual scan of a bar code by an operator of the transport container 120. In another example, a proximity detector 618 may be a geo-location system such as GPS, configured to detect a transport container's location and to detect its proximity to the silo system 112 by, for example, detecting that the transport container 120 has passed into a geofenced area surrounding the silo system 112. In various examples, use of such proximity detectors 618 can provide a consignee with a high-reliability confirmation that a delivery was made, easing the matching process when the invoice is received. Proximity detection information can provide the location and time of arrival of an identified delivery vehicle, and in some examples, can confirm whether a delivery vehicle is in the correct location and provide the consignee and/or driver with a notification if the delivery vehicle is at an incorrect location. Such notification to the driver can help prevent them from proceeding with unloading in an incorrect location. And such notification to the consignee can help reduce or prevent the use of material in the event of an incorrect delivery.

The silo system 112 may further include one or more discharge sensor(s) 613 for detecting whether the silo system 112 is engaged in a material discharge or unloading from the storage chamber 602. For example, a pressure sensor may be associated with a discharge pipe between the storage chamber 602 and the operational silo 114 and configured to detect when the discharge pathway 606 is pressurized. Discharge sensors 613 may further include a blower engagement sensor associated with a blower coupled to the discharge pathway 606. For example, a blower engagement sensor may determine whether a blower associated with the discharge pathway 606 is engaged, operational, or turned on. Discharge sensors 613 may further include a vane feeder engagement sensor configured to detect when a vane feeder is engaged, operational, or turned on for discharging the storage chamber 602.

In one configuration, the silo system 112 further includes a baghouse (not shown) that includes one or more filters for filtering air discharged from the storage chamber 202. In one embodiment, the baghouse is configured to support an air flow rate of at least 2400 cubic feet per minute. An example baghouse that may be used in the silo system 112 is described above with reference FIG. 4.

The silo system 112 may further include one or more communication interface(s) 620 for communicating with an external device, system, or network.

Figure 7:
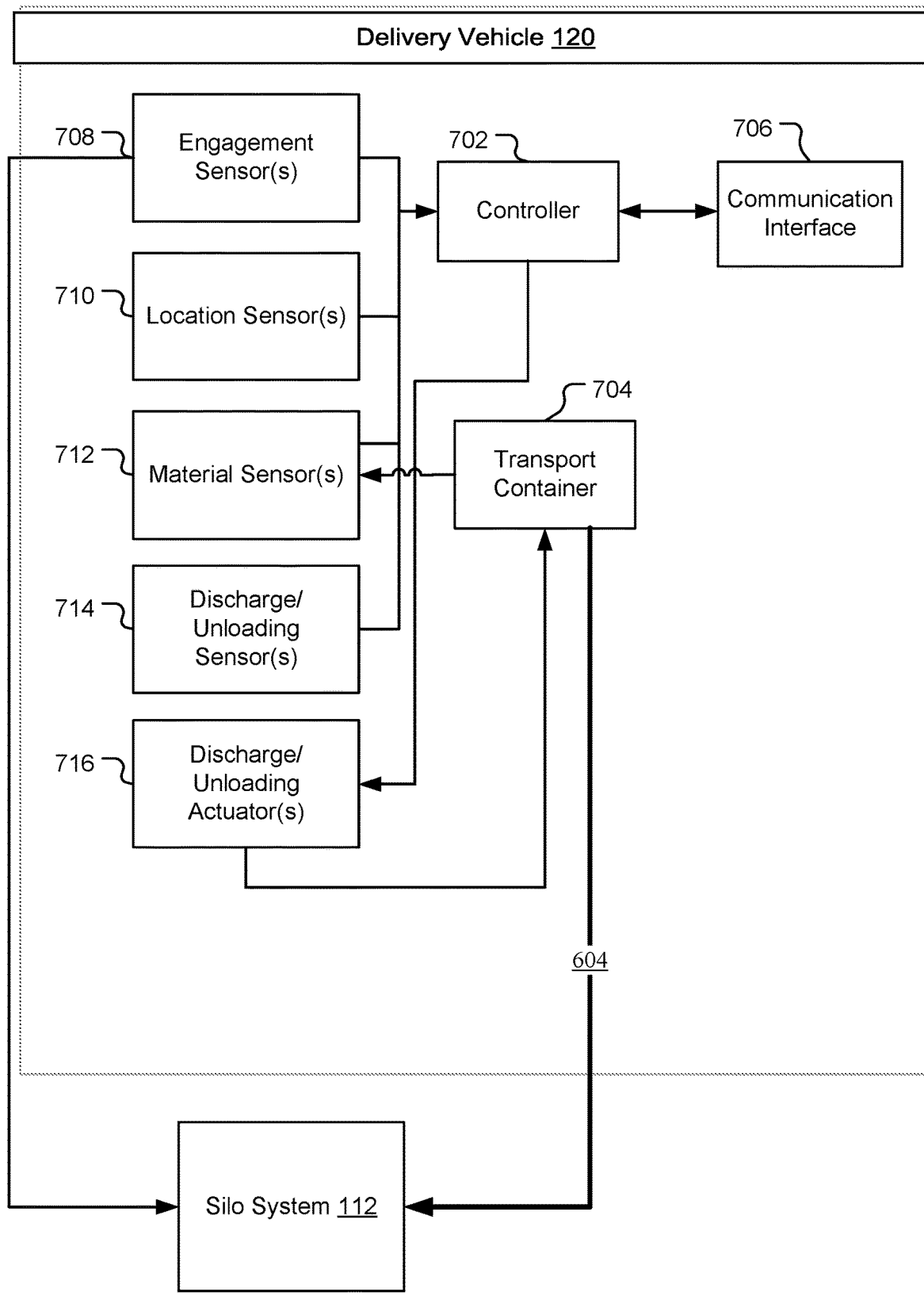
FIG. 7 is a schematic block diagram of a delivery vehicle according to certain aspects of this disclosure.

FIG. 7 is a schematic block diagram of a delivery vehicle 120 according to certain aspects of this disclosure. The delivery vehicle 120 includes a transport container 704, and a discharge pathway 604 associated with the transport container 704, which may be configured to be pressurized by a pneumatic source. The pneumatic source for the discharge pathway 604 may be a blower configured to force air into a tubular structure. The delivery vehicle 120 further includes one or more material sensors 712 associated with the transport container 704, one or more discharge/unloading actuators 716, one or more discharge/unloading sensors 714, one or more location sensors 710, and a controller 702 that is communicatively coupled to the one or more sensors 708, 710, 712, and 714 and to the one or more actuators 716. The controller 704 is configured to control the one or more actuators in response to sensor data from the one or more sensors. The controller 704 may be any suitable electronic controller including but not limited to a microprocessor, a microcontroller, a programmable logic controller (PLC), etc. In some embodiments, one or more of the sensors 708, 710, 712, 714 and/or the communication interface 706 may be augmented to a pre-existing delivery vehicle 120. In other embodiments, a hauler may employ a specialized delivery vehicle 120 having integrated sensors and communication/control systems. In various examples, the communication interface may include a user interface for a driver of the delivery vehicle, including user input and output functions such as receiving notifications. In further examples, the communication interface may include a network interface such as a cellular or wireless network connection for communicating with a network such as the Internet.

The pressurized pathway 604 is configured to be coupled to a corresponding pathway of a silo system 112 holding bulk material. The discharge/unloading actuators 716 enable a discharge or unloading of material from the transport container 704 into the storage chamber of a silo system 112 through the pressurized pathway 604. The controller 702 is configured to control the one or more actuators 716 in response to sensor data from the one or more sensors 708, 710, 712, 714 to provide for a discharge/unloading of material from the transport container 704 to the silo system 112. In some examples, the discharge/unloading actuators 716 may include a blower that may be powered by a suitable power take-off (PTO) coupled to the delivery vehicle 120. For example, a power source of the truck hauling the transport container may be used to power a blower and start the pneumatic process to convey material from the transport container through the intake pathway and into the silo system 112.

The material sensor(s) 712 are configured to sense material carried in the transport container 704. Material sensors 712 may be configured to generate real-time material data relating to a presence of material in the transport container 704. Sensor data from the material sensor(s) 712 is provided to the controller 702 where it is processed to control the discharge or unloading of material from the transport container 704 to the silo system 112. The material sensor(s) 712 may include one or more weight sensors or load cells configured to generate weight information relating to a weight of material in the transport container 704. Such weight information can provide for the weight change at the delivery vehicle, which can be used to confirm the amount of material delivered. In addition, such weight information can provide the time of initiation and cessation (and/or the duration) of an unloading operation, which can be used to confirm expectations for a delivery.

The delivery vehicle 120 may further include one or more engagement sensors 708 for determining whether the delivery vehicle is engaged with the silo system 112 for an unloading process. In some examples, an engagement sensor 708 may operate to exchange identifiers between the delivery vehicle and the silo system at the time of engagement, for confirming particulars about the delivery. And in some examples, an engagement sensor 708 can provide the time of initiation and cessation (and/or the duration) of an unloading operation. Use of an engagement sensor can further provide reliable confirmation that material was unloaded in the correct amount at the correct location. For example, the engagement sensor(s) 708 may include a contact sensor configured to detect engagement and/or disengagement of a fill pipe between the delivery vehicle 120 and the silo system 112. The contact sensor can employ any suitable mechanism for contact sensing, including but not limited to a magnetic sensor, an RFID tag, an electrical contact sensor, a capacitive sensor, a Hall effect sensor, a mechanical switch, etc. In a further example, the engagement sensor(s) 708 may include a PTO engagement sensor configured for generating real-time PTO information indicative of an operational condition of the intake pathway. The controller 702 may determine that the material is being discharged from the transport container 704 in response to PTO information corresponding to an engagement/on signal from the PTO engagement sensor. Subsequently, when the on state is no longer indicated by the output of the PTO engagement sensor, the controller 702 may determine that the deposit of material is completed. Based on the duration of material delivery, i.e., the time between the engagement/on signal and the disengagement/off signal, the controller 702 may determine or confirm the amount of material that was deposited. Accordingly, the PTO information output by the PTO engagement sensor provides an additional data point to corroborate actual, physical delivery of bulk material to the silo system 112.

The delivery vehicle 120 may further include one or more location sensor(s) 710 for detecting a location of the delivery vehicle 120. For example, a location sensor 710 may be configured to detect an arrival or departure of the delivery vehicle 120 to or from a consignee site or point of delivery. Location sensors may include, for example, geolocation sensors such as a GPS system configured to provide continuous or periodic location tracking of the delivery vehicle 120, tied to a delivery vehicle identifier. Location sensors may further include, for example, a proximity sensor such as an RFID tag, configured for detecting a proximity of the delivery vehicle 120 to a point of entry of a consignee site and/or at a point of unloading of a material delivery. Proximity detectors may include any suitable sensor for detecting a proximity of a delivery vehicle 120 and may be manual or automated. For example, a proximity detector may be an RFID tag configured to signal a passing or proximity of the delivery vehicle 120 to a given location having a corresponding RFID reader. In another example, a proximity detector 618 may be a bar code scanner configured to detect a manual scan of a bar code by an operator of the delivery vehicle 120. A location sensor 710 can provide high-reliability confirmation that a delivery vehicle has arrived on location, including the time and location of arrival of an identified delivery vehicle. In some examples such as a GPS system, location sensors 710 can further provide a time and location of departure from a delivery location, and/or a duration of the stay at the delivery location. With location sensor information, the driver of the delivery vehicle (and/or dispatch or anyone else in communication with the network) can obtain a notification of a correct or incorrect location of arrival, reducing or preventing the instance of an incorrect unloading location. Similarly, a consignee can receive a notification of the arrival of a delivery vehicle, and may be enabled to prevent an incorrect delivery from taking place (e.g., by engaging a pinch tube to prevent unloading into an incorrect silo). Furthermore, in some examples such as a GPS system, location sensors can provide real-time notifications if a delivery does not arrive, or is headed in a wrong direction, enabling improved planning and logistics for the consignee, for dispatch, etc.

The delivery vehicle 120 may further include one or more discharge/unloading sensors 714 for detecting a state of operation of a discharge or unloading function of the transport container 704. For example, a pressure sensor may be configured to sense a pressure of a discharge pathway 604 to detect whether the discharge pathway is pressurized for unloading material. Broadly, any sensor configured for detecting an unloading operation may provide real-time data indicating a time and/or duration of a discharge of material from a transport container 704.

Figure 8:
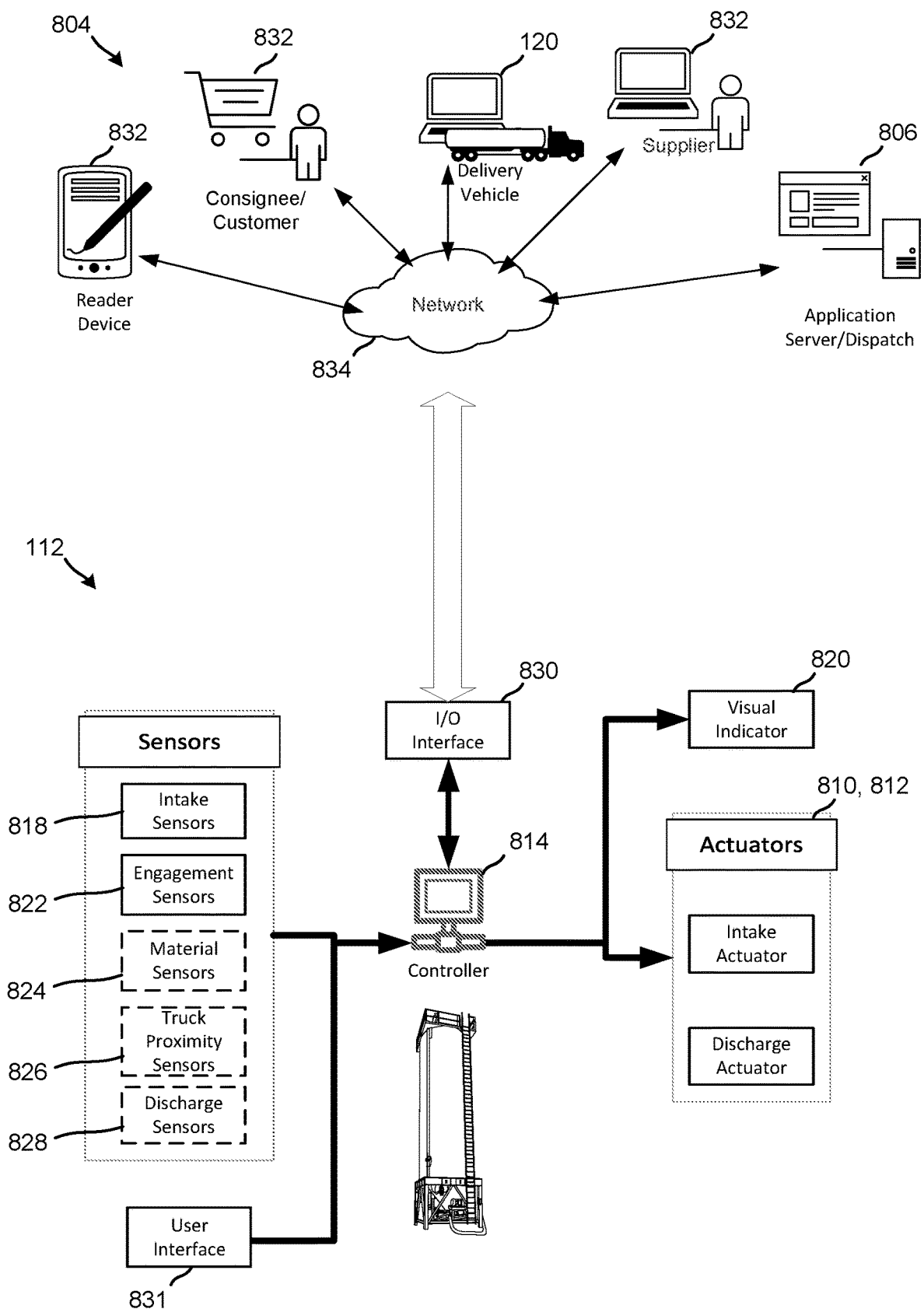
FIG. 8 is a schematic block diagram illustrating functional details of a silo system in conjunction with a bulk management system according to certain aspects of this disclosure.

FIG. 8 is a schematic block diagram illustrating functional details of a silo system 112 integrated with a bulk material management system 804 according to certain aspects of this disclosure. Similar to the silo system 112 described above with reference to FIGS. 1, 2, 3, and 6, the silo system 112 of FIG. 8 includes one or more intake sensors 808, one or more engagement sensors 822, one or more material sensors 824, one or more truck proximity sensors 826, one or more discharge sensors 828, one or more intake actuators 810, one or more discharge actuators 812, and a controller 814.

In one embodiment, the one or more material sensors 824 may be load cells 208. A load cell 208 may be a strain gauge, a piezoelectric load cell, a hydraulic load cell, etc. that provides a signal corresponding to the weight of the storage chamber of the silo system. The load cells 208 may be mounted to the legs of the silo, such as shown in FIG. 3. In one example, the storage chamber may include three, four, or more legs, each being outfitted with a load cell to provide multiple load cells in parallel. In this way, the output of the plural load cells can be added or combined to generate a single weight for the contents of the portable silo (e.g., tonnage), to thereby provide real-time, accurate measurements of the weight of the material in the storage chamber. The load cells 208 may be connected to visual indicator 820 on the exterior of the silo system 802, such as shown in FIG. 3, to show a more detailed level of material in the silo (e.g. "35% remaining" or "35 tons remaining" as opposed to current system of "red", "yellow" and "green").

In another embodiment, the one or more material sensors 824 may be a level sensor (e.g., "Bindicator") that is configured to sense the level of bulk material within the storage chamber of the silo system 112. In yet another embodiment, the one or more material sensors 824 may include a pressure sensor located within storage chamber of the silo system for sensing the air pressure inside the chamber.

In one embodiment, the silo system 112 may include a proximity sensor 826 configured to detect if a delivery truck carrying a transport container of bulk material is within a given distance or radius of the silo system 112. The proximity sensor 826 may be any one or more of: an RF sensor configured to detect an RFID tag mounted to the truck, a radio (e.g., Bluetooth, Wi-Fi, etc.) receiver configured to a detect a radio signal transmitted by a transmitter associated with the truck when the truck is within a defined range of the receiver, or a GPS monitoring system connected to a GPS network that tracks the location of the truck based on a GPS system integrated into the truck.

In another embodiment, the silo system 112 may include an intake sensor 828. As described above, the intake sensor may include a PTO engagement sensor, which may be associated with the truck hauling a transport container of bulk material and is configured to detect when the truck's power is being used to engage a blower to start the pneumatic process to convey material from the transport container into the storage chamber. The PTO engagement sensor detects such power engagement and subsequent disengagement and outputs corresponding PTO information to the controller 814.

The visual indicator 820 may provide indications related to the fill level of the storage chamber. The visual indication may be color based, e.g., green/yellow/red lights wherein a red light indicates the storage chamber is full, a yellow light indicates the storage chamber is approaching capacity, and a green light indicates the storage chamber has plenty of capacity. For those silo systems 112 equipped with a pressure sensor 824, the visual indicator 820 may include a blue light that indicates an overpressure condition within the storage chamber. Some examples may provide more granular information, e.g., corresponding to the force sensors or any other suitable sensor for dynamically informing about the fill level of the portable silo. The visual indicator 820 may be communicatively coupled to, or responsive to, sensor data from any suitable sensor including but not limited to one or more intake sensors 818, engagement sensors 822, a material sensor 824, a proximity sensor 826, or a discharge sensor 828.

The controller 814 includes a processor and a communications interface configured to receive data from the sensors and to output control signals to one or more of the intake actuators 810 and the discharge actuators 812. The controller 814 receives signals from one or more of the sensors and processes the signals to control the operation of the silo system 112 using one or more of the intake actuators 810 and the discharge actuators 812. For example, the controller 814 may control operation of the silo system 112, including an electric pinch tube to enable or disable the deposit of material, and a vane feeder and blower to enable or disable the discharge of material. The controller 814 may also be coupled to the visual indicator 820 to control the lights or indicators to indicate the fill status of the silo system 112.

Information collected by the controller 814 of the silo system 112 may be communicated to the bulk material management system 804 via the network 834 using one of several communication modalities, including but not limited to wireless communication with the Internet. For example, the I/O interface 830 may be a machine-type communication (MTC) or machine-to-machine (M2M) device configured for wireless communication over a cellular network 834, including but not limited to a 4G LTE network. In other examples, the I/O interface 830 may be a Wi-Fi device, a Bluetooth device, or any other suitable wireless or wired communication interface. The silo system 112 may provide direct user input/output to the controller 814 through a user interface 831 (e.g., a monitor, GUI and/or keyboard at the site of the silo system).

Information from the silo system 112 may be conveyed to an application server 806, which may be hosted by a device/system 832 at the hauler, at a third-party site, on the 'cloud,' or at any suitable location. The application server 806 may be configured to aggregate data from one or more silo systems 112. In some examples taking advantage of blockchain technology, an application/database can aggregate consignee production requirements, hauler load commitments, supplier material commitment and consignee's current inventory levels in a shared ledger to allow for a blockchain transaction by all parties, securely and automatically confirming and completing transactions through the full supply circuit of "order/load/deliver/unload/update inventory/invoice/pay/re-order".

The information at the application server 806 may be made available to other devices/systems 832 configured to access the application server. Users such as the consignee, the hauler, the supplier or any other entity with authorization to access the application server 806 may accordingly access stored sensor data from any number of silo systems 112, including load cell weights, fill levels, pressure, etc., either real-time, at a selected time, or as a function of time (e.g., in a chart or graphical form).

The silo system 112 may generate a database based on information received by the controller 814, or contribute information to the bulk material management system 804. For example, the silo system 112 may provide information to the application server 806 that generates a database corresponding to one or more silo systems 112. In addition, the application server 806 may utilize the sensor data, potentially combined with other information, such as product orders, product shipment indications, etc., to provide users additional information. For example, users may obtain delivery times, usage history, and delivery schedules. Haulers may take advantage of the databases combined over a plurality of silo systems 112 to generate still further information, including but not limited to truck efficiency (e.g., tons delivered per day), silo efficiency, and truck delivery routes.

Where the parties, e.g., hauler, supplier, and consignee, have previously agreed and defined the scope and method of data transfer, the silo system's communication capabilities may serve as a connection between the supplier (e.g. cement manufacturer) and consignee (e.g. ready mix producer) to automatically confirm receipt of materials and match transaction records to generate sales invoices. The consignee (e.g. ready mix producer) may utilize the silo system's communication capabilities to automatically, and in real-time, send material usage data, along with other plant operations information such as production rates and scheduling, preventive or predictive maintenance triggers and workforce time/payroll information to its centralized office or database.

Relevant parties can access information including but not limited to the current level in a storage chamber of a silo system 112; what the consignee has received; and what the consignee has discharged out of the storage chamber of the silo system. The hauler can access aggregated data from multiple silo systems 112 which enables the hauler to plan deliveries to multiple parties more efficiently. Knowledge of capacity, historic usage rates, current levels of inventory, etc. can enable the hauler to prioritize deliveries to those most in need, and to determine when it may be appropriate to defer deliveries to consignees who have remaining inventory.

The application/database available through the application server 806 can enable raw material usage confirmation/reporting by confirming on-hand inventory, plus authenticating incoming inventory less production usage by the consignee. This feature may be a component of the overall inventory 'cycle' that would be a part of automated re-order, blockchain or other automated management system, and/or a component of a fully automated process.

In one embodiment, actual delivery of incoming inventory of bulk material may be authenticated by the silo system 112 without the need for consignee presence at delivery site or consignee manual input to the system, using the verification sensors 826, 828. For example, an increase in weight at storage chamber by one truckload (as sensed by one or more load cells 818), contemporaneous with: 1) a proximity detection (as sensed by a proximity sensor 826) indicating that the identified delivery truck carrying a transport container of bulk material was proximate to the storage chamber and 2) an power engagement/on detection (as sensed by a PTO engagement sensor 828) followed by a power disengagement/off detection can substantiate delivery of a load of bulk material to the desired location. Other various combinations of sensor 826, 828 inputs may be used to confirm actual delivery. For example, in the absence of signals from load cells, the weight or amount of material deposited may be inferred from the duration of time between a power engagement/on detection (as sensed by a PTO engagement sensor 828) and a power disengagement/off detection.

The application/database available through the application server 806 may graphically illustrate inventory levels and usage/consumption to allow the consignee to accurately plan inventory requirements. For example, a graphical dashboard may show the consignee's material requirements/bill of materials daily/weekly/monthly and may overlay current/planned deliveries to show expected material shortage or excess. In some examples, such an application may automate future orders to address gaps between inventory and demand, adjusting real-time for changes in demand forecasts, allowing semi-automatic adjusting per pre-set maximum and minimum re-order/cutoff points, or allowing fully manual ordering to address expected inventory imbalance or incorporate other haulers/suppliers not connected to the application/database.

FIG. 9 is a cross-functional flow chart illustrating a bulk material delivery process according to some aspects of the present disclosure. The illustration includes three lanes to illustrate operations from three points of view: that of the material supplier, that of the material hauler or shipper, and that of the consignee receiving the delivery.

At the order phase 902, a silo system 112 may monitor its storage chamber, e.g., by virtue of one or more material sensors. The consignee may additionally consider such factors as the rate of usage of the material in the storage chamber, the projected use of the material in the future, the date and time (e.g., traffic conditions). Based on such factors, a timely order for additional material for the silo system 112 may be placed. In some examples, the ordering process may be automatic with the aim to keep the silo system 112 operational in a continuous manner. The material supplier may accordingly receive the order via a network connection as described above in relation to FIG. 8. The supplier may then fill the order by providing the hauler with the material to transport to the consignee site. When the order is accepted the supplier may provide the consignee with an order confirmation via the network connection. The supplier and/or consignee may further provide the hauler with delivery information such as an order identifier (e.g., a bill of lading), a destination, an amount or quantity ordered, a schedule for delivery, etc.

At the transport phase 904, the hauler may employ a location sensor 710 to monitor its route to the consignee site. For example, the delivery vehicle may be equipped with a GPS system for monitoring its location and trajectory. Here, the location sensor 710 data may be relayed through the network connection to the consignee to provide real-time information on the status of the delivery. In some examples, if a delivery is delayed (e.g., the hauler goes to the wrong location or is otherwise delayed) the consignee may receive a notification of the delay, which the consignee can employ to rectify the order with the supplier and/or hauler. Moreover, if the hauler goes off the route to the consignee site, the driver may receive a notification, insuring a return to the correct route to the planned destination. In some examples, delivery vehicle location information may be provided in connection with order information, information about goods on board (e.g., material or goods description, amount or quantity on board), etc.

At the arrival phase 906, the delivery vehicle may detect its arrival at the consignee site. For example, a GPS system may detect that the delivery vehicle crosses a geofence surrounding a delivery location or arrives within a predetermined radius of a delivery location. In some examples, the delivery vehicle may be equipped with a proximity sensor, RFID tag, or similar technology for detecting the arrival of the delivery vehicle. For example, when the delivery vehicle enters the consignee site or passes an entrance to the consignee site, the proximity sensor may detect the vehicle arrival and notify the consignee via the network connection. The driver of the delivery vehicle may similarly receive a corresponding notification of arrival at the correct site for delivery. In some examples, the point of delivery may include a separate proximity sensor for detecting that the delivery vehicle arrived at the correct location for unloading. For example, a consignee site may include multiple silos and it may be useful for the delivery vehicle and for the consignee to confirm not only that the delivery vehicle has arrived on site, but that the delivery vehicle has arrived at the precise location needed for unloading. Here, in the event of arrival at an incorrect location, the delivery driver may fail to receive a notification of arrival, and/or may receive a notification of stopping at an incorrect location.

At the unloading phase 908, engagement sensors at the delivery vehicle and/or at the silo system may detect an engagement of the delivery vehicle with the silo system. For example, when an operator connects the delivery vehicle to a fill pipe at the silo system, an engagement sensor 609 at the silo system 112 and/or an engagement sensor 708 at the delivery vehicle 120 may detect such engagement. The engagement sensors may be configured not only to detect engagement, but also to exchange delivery information such as the order information, the material or goods on board, and their intended destination. In this way a proper delivery can be confirmed via controller(s) 614 and/or 702, and engagement information may be relayed to the network 834. The engagement sensor 708 may further detect an operational condition of a PTO function and/or a blower for unloading the delivery vehicle 120. A pressure sensor in the fill pipe may detect whether a vehicle unloading process has commenced. During the unloading operation, one or more material sensors 608 at the silo system 112 may detect and monitor the loading of material into the storage chamber. For example, the weight of the storage chamber may be monitored, and a change in the weight can be used to confirm that material is being loaded into the storage chamber. Further, a duration of the weight change can be used to confirm an expected amount of material being delivered, which may be useful in the event of simultaneous unloading causing the weight change not to accurately reflect the total delivered. Similarly, a fill level sensor at the silo system 112 may detect and monitor a fill level of material in the storage chamber. One or more material sensors 712 at the delivery vehicle 120 may additionally detect and monitor the unloading of material from the delivery vehicle. For example, a weight sensor at the delivery vehicle may detect when an unloading operation commences based on a change in the weight of the delivery vehicle, and a change in the weight can be used to confirm the amount delivered. The unloading operation may be detected as complete by way of any one or more of the weight ceasing to change, the PTO sensor detecting a shutoff of the PTO, a disengagement from the fill pipe, etc. The delivery vehicle may further detect and notify the network of its departure from the delivery site, e.g., by virtue of its GPS location system and/or a proximity detector detecting that the delivery vehicle is no longer located at the delivery site.

Once delivery is completed, high reliability confirmation of the details of the delivery can be provided and an invoicing process can be automated. For example, at an invoicing phase 910, invoices may be automatically generated and distributed to the supplier and to the consignee. For example, in a case where the supplier contracts the hauler for an order from the consignee, the supplier may receive an invoice from the hauler, and the consignee may receive an invoice from the supplier. In another example, in a case where the consignee hires the hauler, the consignee may receive an invoice from both the supplier and from the hauler. Further, since the silo system has access to the detailed delivery confirmation information via the network 834, each generated invoice can include not only ticket information from the bill of lading but associated high-reliability delivery information in addition. For example, the consignee may receive an invoice that indicates the amount and type of material delivered, and the place, date and time of delivery with multiple levels of confirmation (e.g., via location sensors, proximity sensors, engagement sensors, load sensors, etc.). No longer is it necessary for the consignee to undertake a matching phase 912, matching a received invoice with a bill of lading received at the time of delivery. Rather, the invoice is automatically matched to the bill of lading information via the silo system.

Figure 10:
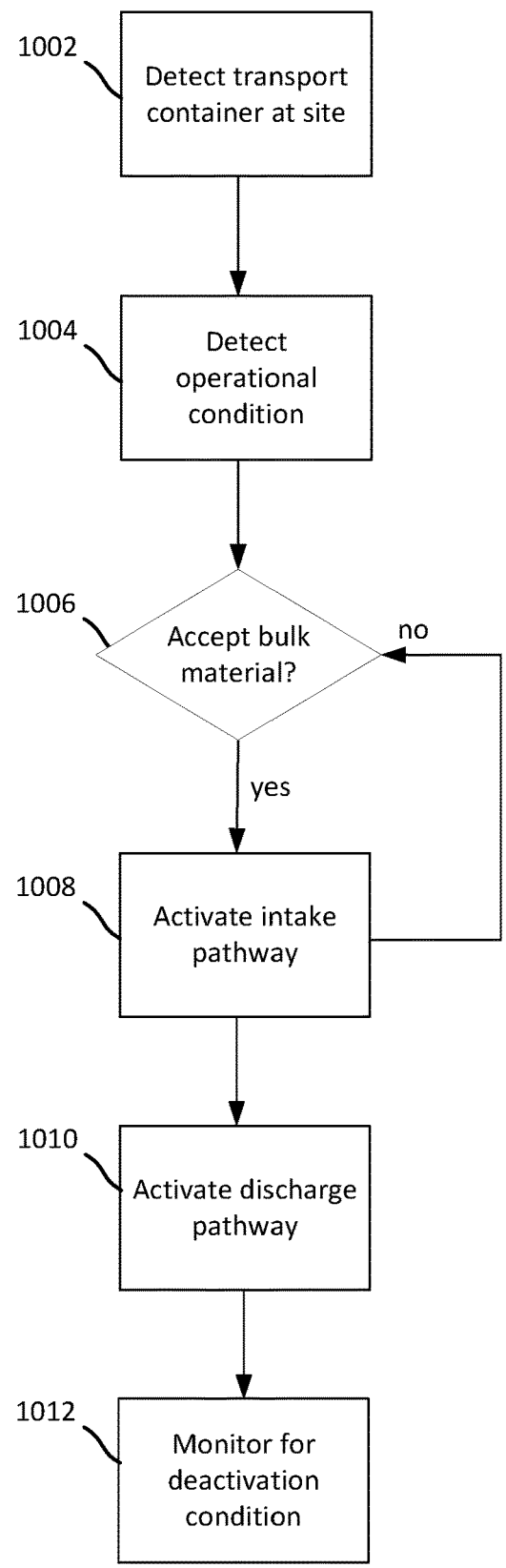
FIG. 10 is a flow chart of a method of delivering a bulk material carried by a transport container to a site.

FIG. 10 is a flow chart of a method of receiving a bulk material delivery at a silo system. The method may be performed, for example, by a silo system 112 of FIGS. 1, 2, 3, 6, and/or 8 that is located at the site.

At step 1002, a controller (or processor) of the silo system detects an arrival of a truck carrying a transport container of bulk material at the site. The arrival may be detected based on signals from a proximity sensor, e.g., RFID sensor, GPS tracking, that is associated with the silo system.

At step 1004, the controller of the silo system detects an operational condition of an intake pathway between the transport container and the storage chamber of the silo system. The operational condition may be detected based on signals received from one or more verification sensors. For example, a PTO engagement sensor associated with the truck hauling the transport container may output an engagement/on signal when a power source of the truck is used to power a blower coupled to the intake pathway. The blower may be associated with the truck or the transport container. The on state of the blower may result from a manual operation by an operator at the transport container. An engagement/on output signal from the PTO engagement sensor may further serves as a real-time verification that the bulk material is actually being delivered.

At step 1006, the controller determines whether the storage chamber is able to accept bulk material. For example, the controller may receive signals from one or more material sensors, e.g., load cells, level sensors, pressure sensor, associated with the silo system that are indicative of the amount of material in the storage chamber. If the storage chamber is not able to accept bulk material, the process loops back to step 1006 where the processor continues to determine whether the storage chamber is able to accept bulk material.

If the storage chamber is able to accept bulk material, the process proceeds to step 1008, where the controller activates an intake pathway of the silo system that is engaged with an output port of the transport container. The intake pathway may include an intake tube and an intake actuator, e.g. pinch tube, that is configured to block flow through the tube. The intake pathway may be activated, for example, by setting a normally closed pinch tube that blocks flow through the tube, to an open state that allows material to flow through the tube.

At step 1010, the controller activates a discharge pathway of the silo for a period of time that at least partially coincides with the activation of the intake pathway. The discharge pathway is configured to transport material from the storage chamber to another location on site. In one configuration, the discharge pathway includes a discharge tube, a first discharge actuator in the form of a vane feeder, and a second discharge actuator in the form of a blower. The vane feeder functions to isolate the pneumatic pressure within the discharge pathway from the pneumatic pressure within the intake pathway and the interior of the storage chamber, to thereby provide for simultaneous deposit and discharge of material into and out of the storage chamber in a manner that reduces or avoids disruptive pneumatic effects at the point of discharge, such as uneven or uncontrollable flow of material.

At step 1012, the controller monitors for a condition to deactivate the intake pathway. The condition may relate to the amount of material in the storage chamber. For example, if the controller determines that the storage chamber is near capacity based on signals received from one or more material sensors, the controller will deactivate the intake pathway by setting the intake actuator, e.g., pinch tube, to a state where it blocks flow through the intake tube. Alternatively, the controller may send a signal to the truck to turn off the power source that is powering the blower coupled to the intake pathway. Although the order of activation shown in FIG. 10, includes activating the intake pathway prior to the discharge pathway, the order of activation is not limited as such, and may be the opposite. Furthermore, activation of the two pathways may occur at the same time.

Thus, disclosed herein is a silo system and related method that provides for a transfer of bulk material from a hauler's transport container to a storage chamber simultaneous with a transfer of bulk material from the chamber to a consignee's operational silo. Positioning the vane feeder at the discharge point isolates the storage chamber from the discharge point, thereby enabling pressurized filling of the storage chamber at the same time as material is discharged from the storage chamber into the consignee's affixed operational silo. This reduces or eliminates the wait time for a delivery truck to begin unloading or depositing bulk material at consignee site. The electric pinch tube reduces or eliminates need to coordinate with the consignee, and can open up the window for delivery to potentially any time, day or night.

The silo system disclosed herein is configured to significantly increase the speed of loading and unloading material to and from the storage chamber of the silo. This is enabled by oversized fill and discharge pipes/hoses, a more powerful blower, and larger baghouse venting. For example, based on a gross vehicle weight (GVW) limit of 80,000 lbs., a typical truckload may carry 27 tons of material. In conventional systems, for a truck to unload its entire load directly into an operational silo, it may take an hour, two hours, or more. According to an aspect of the present disclosure, by utilizing the disclosed features in a suitable combination (e.g., wider intake hoses, stronger blower, larger baghouse, larger vane feeder), a full truckload may be unloaded into the portable silo in 30 minutes or less.

As previously described, the silo system disclosed herein may be portable, i.e., configured to be transported and semi-permanently placed at a first site and later removed and transported to another site. A portable silo system has several advantages over permanent silo systems including the ability to be moved different locations as market and operational needs change, and a smaller size that requires a smaller footprint of land that in turn reduces the expense of land for the consignee.

In permanent silo systems "operational" silos include fixed legs that are elevated above the plant to allow for gravity discharge and feed. The engineering for erection, and resulting cost and time of removal and transport of these silos makes them very "permanent" (and require shutdown of the plant for removal). Furthermore, removal of such silos typically involves the destruction or deformation of component parts. For example, the removal of a permanently installed operational silo may require the cutting of fixed legs that support the silo chamber. The portable silo disclosed herein, in comparison, is hauled to the site on its own integral axle/wheels, erected and/or removed in a day, and can be installed or removed while the plant is in operation.

The portable silo system also has several advantages over other, less permanent storage containers, such as a guppy or pig. For example, a portable silo system configured according to aspects of this disclosure might have about ⅓ the footprint of a conventional guppy or pig of similar capacity. The portable silo system transfers product to consignee's operational silo as needed, for example, by simple operator push-button that actuates the vane feeder and blower at the discharge pathway. Thus, the consignee avoids need to manually pressurize a tank and adjust multiple valves as required when using a guppy or pig and avoids related safety hazard exposure.

A portable silo system provides additional storage capacity on-site at the consignee location. This reduces or eliminate the consignee's risk of running out of raw materials and eliminate the consignee's need for additional equipment. The consignee and supplier gain additional local storage capacity within their market areas without the need for significant added capital and operating costs associated with a fixed, centralized terminal or distribution facility.

Figure 11:
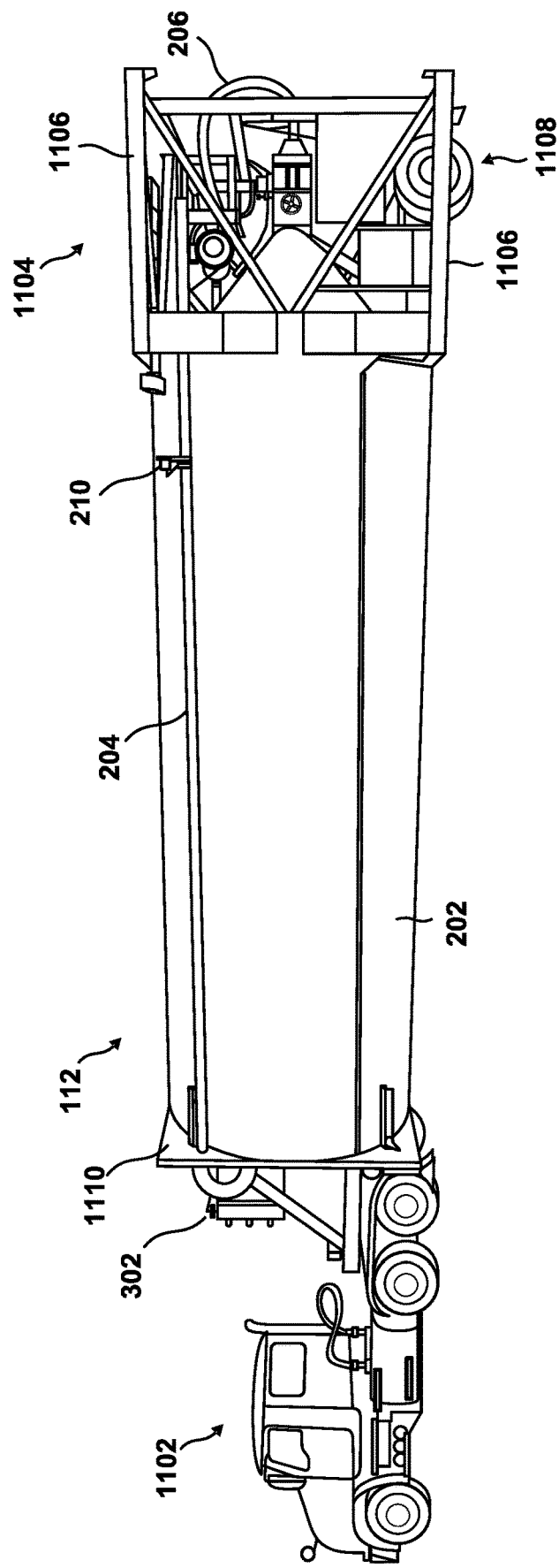
FIG. 11 is an illustration of a portable configuration of the silo system of FIG. 2 being hauled by a truck.
Figure 12:
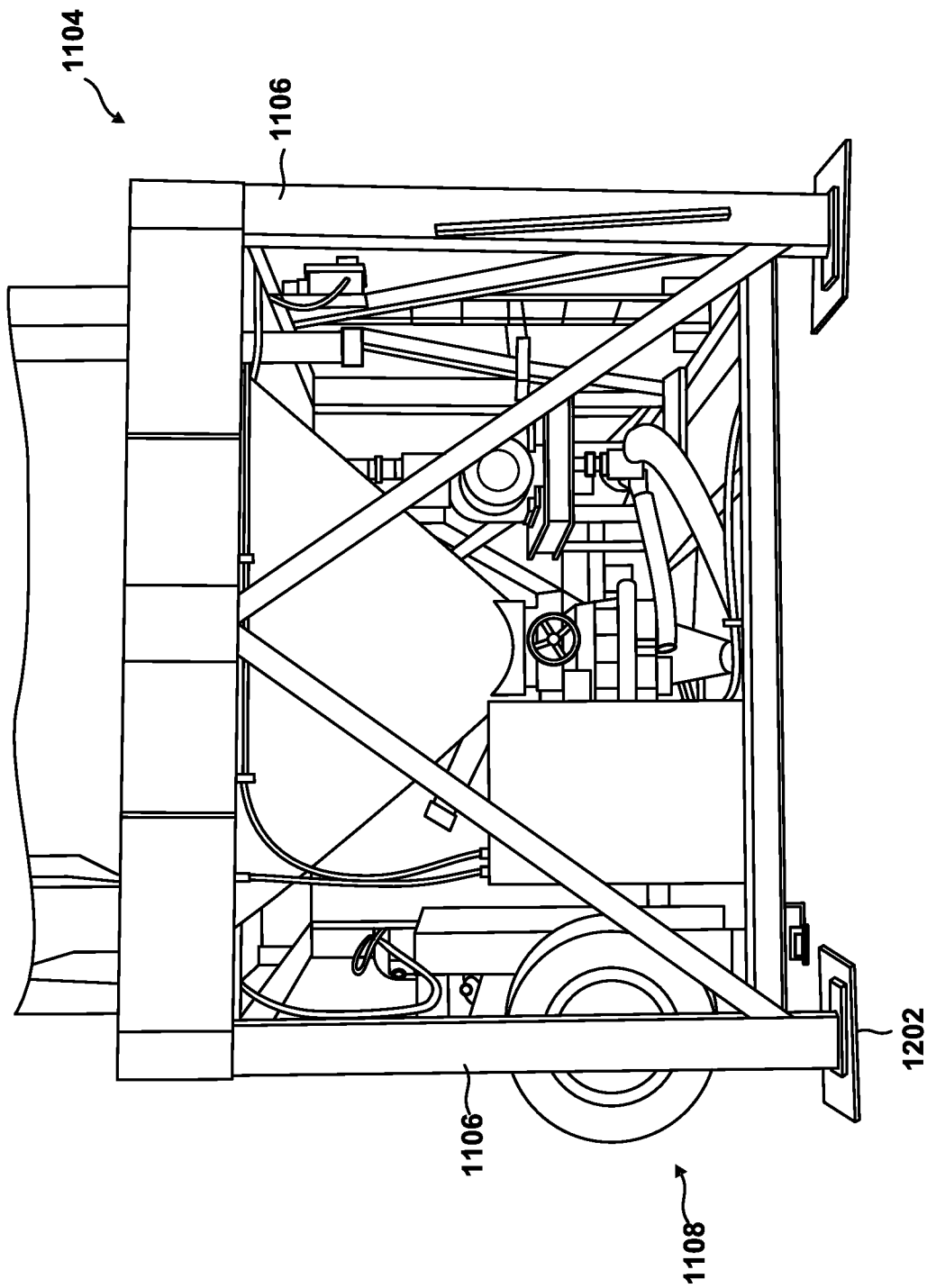
FIG. 12 is an illustration of the base structure of the portable silo system of FIG. 11 after installation on site.

FIG. 11 is an illustration of a portable configuration of the silo system 112 of FIG. 3A being hauled by a truck 1102. FIG. 12 is an illustration of a base structure 1104 of the portable silo system 112 of FIG. 11 after installation on site. The portable silo system 112 includes a base structure 1104 having four legs 1106 and an axel/wheel structure 1108 spanning between two of the legs. The storage chamber 202 is integrated with and extends from the base structure 1104. A platform 1110 is located at the end/top of the storage chamber 202 and the baghouse 302 is secured to the platform. The platform 1110 also includes a mechanism for hitching the portable silo system 112 to the truck 1102. Other components of the silo system 112, including the intake pathway 204, the discharge pathway 206, the one or more material sensors, the plurality of actuators, and the controller are fixedly associated with either of the base structure or the storage chamber 202 to thereby enable portable transport of a fully assembled silo system.

Fixedly associated in this context may mean that a component is permanently coupled to the base structure 1104 or the storage chamber 202 in a way that does not allow for removal without affecting the structural integrity of either the component or the base structure or storage chamber. For example, a component that is welded to the base structure is considered to be permanently coupled to the base structure because removal of the component would damage or deform both the component and the base structure. Fixedly associated in this context may mean that a component is removably coupled to the base structure 1104 or the storage chamber 202 in a way that does allow for removal without affecting the structural integrity of either the component or the base structure or storage chamber. For example, a component that is bolted to the base structure is considered to be removably coupled to the base structure because removal of the component would not damage or deform either of the component are the base structure. Fixedly associated may also mean that a component is indirectly coupled, either permanently or removably, to the base structure 1104 or the storage chamber 202 through an intervening component. For example, the pinch tube 210 is indirectly coupled to the storage chamber 202 through its association with the intake pathway 204.

Once located on site, the silo system 112 is positioned near an installation site and separated from the truck 1102. The silo system 112 is then raised to a vertical position using a crane to place the legs 1106 of the base structure 1104 on a ground pad 1202. The legs 1106 are then secured to the ground pad 1202 using bolts and other appropriate means. The silo system 112 is then coupled to the operational silo by connecting the discharge pathway 206 to an operational silo. Once the portable silo system 112 is no longer needed at the site, the system may be decoupled from the operational silo, separated from the ground pad 1202, moved to a horizontal position using a crane, hitched to a truck 1102 and then transported to a different location or site.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of delivery management comprising:
receiving a first data from a first sensor of a dry bulk material storage chamber, the dry bulk material storage chamber configured to receive a dry bulk material from a transport container of a truck, the first data indicative of whether a loading of the dry bulk material from the transport container into the dry bulk material storage chamber is in process;
receiving a second data from a second sensor of the dry bulk material storage chamber, the second data indicative of an amount of the dry bulk material in the dry bulk material storage chamber;
receiving a third data from a third sensor of the dry bulk material storage chamber, the third data indicative of whether the transport container is engaged with an intake pathway of the dry bulk material storage chamber;
controlling an intake actuator coupled to the intake pathway of the dry bulk material storage chamber, the intake actuator controlling a delivery of the dry bulk material from the transport container into the intake pathway of the dry bulk material storage chamber;
generating a confirmation of the delivery of the dry bulk material from the transport container to the dry bulk material storage chamber based at least on the first data of the first sensor, the second data of the second sensor, and the third data of the third sensor; and
transmitting an invoice associated with the delivery of the dry bulk material based on the confirmation,
wherein a discharge actuator coupled to the dry bulk material storage chamber is configured to control a discharge of the dry bulk material from the dry bulk material storage chamber to a silo simultaneously with the delivery of the dry bulk material from the transport container into the intake pathway of the dry bulk material storage chamber, the silo being different from both the transport container and the dry bulk material storage chamber.

2. The method of claim 1, further comprising:
receiving the first data in real-time;
receiving the second data in real-time, wherein the amount is indicative of at least one of a level or a weight of the dry bulk material stored in the dry bulk material storage chamber; and
receiving a fourth data in real-time from a discharge sensor of the dry bulk material storage chamber, the fourth data indicative of whether the dry bulk material is being discharged from the dry bulk material storage chamber into the silo.

3. The method of claim 1, further comprising:
receiving a proximity sensor data comprising at least one of:
 a first proximity data from a geolocation sensor configured to sense a geolocation of the transport container;
 a second proximity data from a first proximity detector coupled to the dry bulk material storage chamber and configured to detect a proximity of the transport container to the first proximity detector; or
 a third proximity data from a second proximity detector coupled to the transport container and configured to detect the proximity of the dry bulk material storage chamber to the second proximity detector.

4. The method of claim 1, wherein the third sensor is at least one of:
a first contact sensor coupled to the dry bulk material storage chamber;
a second contact sensor coupled to the transport container; or a power take-off (PTO) engagement sensor configured to generate real-time PTO information indicative of an operational condition of the intake pathway.

5. The method of claim 1, wherein the transport container of the truck is a pneumatic transport container of a pneumatic tank truck.

6. The method of claim 1, wherein the delivery is responsive to pressurizing the intake pathway.

7. A delivery management system comprising:
a controller;
a first sensor of a dry bulk material storage chamber, the first sensor communicatively coupled to the controller;
a second sensor of the dry bulk material storage chamber, the second sensor communicatively coupled to the controller;
a third sensor of the dry bulk material storage chamber, the third sensor communicatively coupled to the controller;
an intake actuator coupled to an intake pathway of the dry bulk material storage chamber, the intake actuator communicatively coupled to the controller;
a discharge actuator coupled to the dry bulk material storage chamber, wherein the discharge actuator is configured to control a discharge of a dry bulk material from the dry bulk material storage chamber to a silo simultaneously with a delivery of the dry bulk material from a transport container of a truck into the intake pathway of the dry bulk material storage chamber, the silo being different from both the transport container and the dry bulk material storage chamber; and
a communication interface communicatively coupled to the controller, wherein the controller is configured to:
receive a first data from the first sensor of the dry bulk material storage chamber, the dry bulk material storage chamber configured to receive the dry bulk material from the transport container of the truck, the first data indicative of whether a loading of the dry bulk material from the transport container into the dry bulk material storage chamber is in process;
receive a second data from the second sensor of the dry bulk material storage chamber, the second data indicative of an amount of the dry bulk material in the dry bulk material storage chamber;
receive a third data from the third sensor of the dry bulk material storage chamber, the third data indicative of whether the transport container is engaged with the intake pathway of the dry bulk material storage chamber;
control the intake actuator coupled to the intake pathway of the dry bulk material storage chamber, the intake actuator controlling the delivery of the dry bulk material from the transport container into the intake pathway of the dry bulk material storage chamber;
generate a confirmation of the delivery of the dry bulk material from the transport container to the dry bulk material storage chamber based at least on the first data of the first sensor the second data of the second sensor and the third data of the third sensor; and
transmit an invoice associated with the delivery of the dry bulk material based on the confirmation.

8. The system of claim 7, wherein in the controller is further configured to:
receive the first data in real-time;
receive the second data in real-time, wherein the amount is indicative of at least one of a level or a weight of the dry bulk material stored in the dry bulk material storage chamber; and
receive a fourth data in real-time from a discharge sensor of the dry bulk material storage chamber, the fourth data indicative of whether the dry bulk material is being discharged from the dry bulk material storage chamber into the silo.

9. The system of claim 7, wherein the controller is further configured to receive a proximity sensor data comprising at least one of:
a first proximity data from a geolocation sensor configured to sense a geolocation of the transport container;
a second proximity data from a first proximity detector coupled to the dry bulk material storage chamber and configured to detect a proximity of the transport container to the first proximity detector; or
a third proximity data from a second proximity detector coupled to the transport container and configured to detect the proximity of the dry bulk material storage chamber to the second proximity detector.

10. The system of claim 7, wherein the third sensor is at least one of:
a first contact sensor coupled to the dry bulk material storage chamber;
a second contact sensor coupled to the transport container; or
a power take-off (PTO) engagement sensor configured to generate real-time PTO information indicative of an operational condition of the intake pathway.

11. The system of claim 7, wherein the transport container of the truck is a pneumatic transport container of a pneumatic tank truck.

12. The system of claim 7, wherein the delivery is responsive to pressurizing the intake pathway.

* * * * *